(12) United States Patent
Omata

(10) Patent No.: US 12,064,829 B2
(45) Date of Patent: Aug. 20, 2024

(54) METHOD FOR MANUFACTURING A ROD

(71) Applicant: Hitachi Astemo, Ltd., Ibaraki (JP)

(72) Inventor: Yasuhisa Omata, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 205 days.

(21) Appl. No.: 17/762,151

(22) PCT Filed: Aug. 26, 2020

(86) PCT No.: PCT/JP2020/032103
§ 371 (c)(1),
(2) Date: Mar. 21, 2022

(87) PCT Pub. No.: WO2021/059831
PCT Pub. Date: Apr. 1, 2021

(65) Prior Publication Data
US 2022/0347787 A1    Nov. 3, 2022

(30) Foreign Application Priority Data
Sep. 26, 2019  (JP) .................. 2019-175583

(51) Int. Cl.
*B23K 20/00* (2006.01)
*B23K 20/12* (2006.01)
*B23K 101/00* (2006.01)

(52) U.S. Cl.
CPC ........ *B23K 20/12* (2013.01); *B23K 2101/003* (2018.08)

(58) Field of Classification Search
CPC .......... B23K 20/12–1295; B23K 20/26; B23K 2101/003; F16F 9/062; F16F 9/3221; F16F 9/32; B23Q 3/06

(Continued)

(56) References Cited

U.S. PATENT DOCUMENTS 3,452,914 A * 7/1969 Oberle ................... B23K 20/12
228/114.5
3,596,570 A * 8/1971 Kenyon ................... F16J 10/02
92/260

(Continued)

FOREIGN PATENT DOCUMENTS

JP  55-61389   5/1980
JP  55-077988  6/1980

(Continued)

OTHER PUBLICATIONS

Office Action issued Nov. 1, 2022 in corresponding Japanese Application No. 2021-548439, with English Translation.

(Continued)

*Primary Examiner* — Kiley S Stoner
(74) *Attorney, Agent, or Firm* — Wenderoth, Lind & Ponack, L.L.P.

(57) ABSTRACT

A method for manufacturing a rod includes a step of preparing a hollow first member and a second member formed so as to have a portion smaller in outer diameter than an outer diameter of the first member, a restraining step of placing a restraining member into abutment with an outer peripheral surface of the first member, a step of moving an inner peripheral surface of the first member and an outer peripheral surface of the second member closer to each other while rotating at least one of the first member or the second member, and a step of joining the first member and the second member by welding with the aid of friction by axially pressing in the first member and the second member by a predetermined amount after placing the inner peripheral surface of the first member and the outer peripheral surface of the second member into contact.

4 Claims, 16 Drawing Sheets

(58) Field of Classification Search
USPC ............................ 228/112.1–114.5, 2.1–2.3
See application file for complete search history.

(56) References Cited

U.S. PATENT DOCUMENTS

| | | | | |
|---|---|---|---|---|
| 3,790,058 | A * | 2/1974 | Filkorn | B23K 37/08 228/2.3 |
| 6,142,360 | A * | 11/2000 | Hutt | B29C 66/63 228/114.5 |
| 2009/0159643 | A1 * | 6/2009 | Wimmer | F16L 41/082 228/2.1 |
| 2010/0119772 | A1 * | 5/2010 | Christ | F16B 37/061 228/114.5 |
| 2013/0276740 | A1 * | 10/2013 | Wandrie, III | B23K 20/129 123/193.6 |
| 2014/0150955 | A1 * | 6/2014 | Slattery | B23K 37/0426 156/538 |
| 2016/0008917 | A1 * | 1/2016 | Hara | B23K 33/006 403/270 |
| 2021/0003188 | A1 * | 1/2021 | Omata | F16F 9/34 |
| 2021/0346978 | A1 * | 11/2021 | Nagai | B23K 20/12 |

FOREIGN PATENT DOCUMENTS

| | | | | |
|---|---|---|---|---|
| JP | 2001-330070 | | 11/2001 | |
| JP | 2015042891 | A * | 3/2015 | ............ B23K 20/12 |
| JP | 5873737 | | 3/2016 | |
| JP | 2017198227 | A * | 11/2017 | ............... F16F 9/32 |
| WO | WO-2015096675 | A1 * | 7/2015 | ............ B23K 20/12 |

OTHER PUBLICATIONS

International Search Report issued Oct. 13, 2020 in International Application No. PCT/JP2020/032103, with English Translation.
Written Opinion of the International Searching Authority issued Oct. 13, 2020 in International Application No. PCT/JP2020/032103, with English Translation.

* cited by examiner

METHOD FOR MANUFACTURING A ROD

TECHNICAL FIELD

The present invention relates to a method for manufacturing a rod.

BACKGROUND ART

There is a technique that manufactures a rod by performing friction pressure welding on two members (for example, refer to PTL 1).

CITATION LIST

Patent Literature

PTL 1: Japanese Patent No. 5873737

SUMMARY OF INVENTION

Technical Problem

Then, a demand is raised for improvement of the quality of manufacturing the rod.

Therefore, an object of the present invention is to provide a method for manufacturing a rod that can improve the manufacturing quality.

Solution to Problem

According to one aspect of the present invention, a method for manufacturing a rod includes a step of preparing a hollow first member, which becomes a portion of the rod that slidably contacts a sliding contact member, and a second member, which becomes a portion of the rod that does not slidably contact the sliding contact member and is formed so as to have a portion smaller in outer diameter dimension than an outer diameter dimension of the first member, a restraining step of placing a restraining member into abutment with an outer peripheral surface of the first member, a step of moving an inner peripheral surface of the first member and an outer peripheral surface of the second member closer to each other while rotating at least any one of the first member or the second member, and a step of joining the first member and the second member by a welding connection with the aid of friction by axially pressing in the first member and the second member by a predetermined amount after placing the inner peripheral surface of the first member and the outer peripheral surface of the second member into contact with each other.

Advantageous Effects of Invention

According to the one aspect of the present invention, the manufacturing quality can be improved.

DESCRIPTION OF EMBODIMENTS

In the following description, a method for manufacturing a rod according to one embodiment of the present invention will be described with reference to the drawings.

Figure 1:
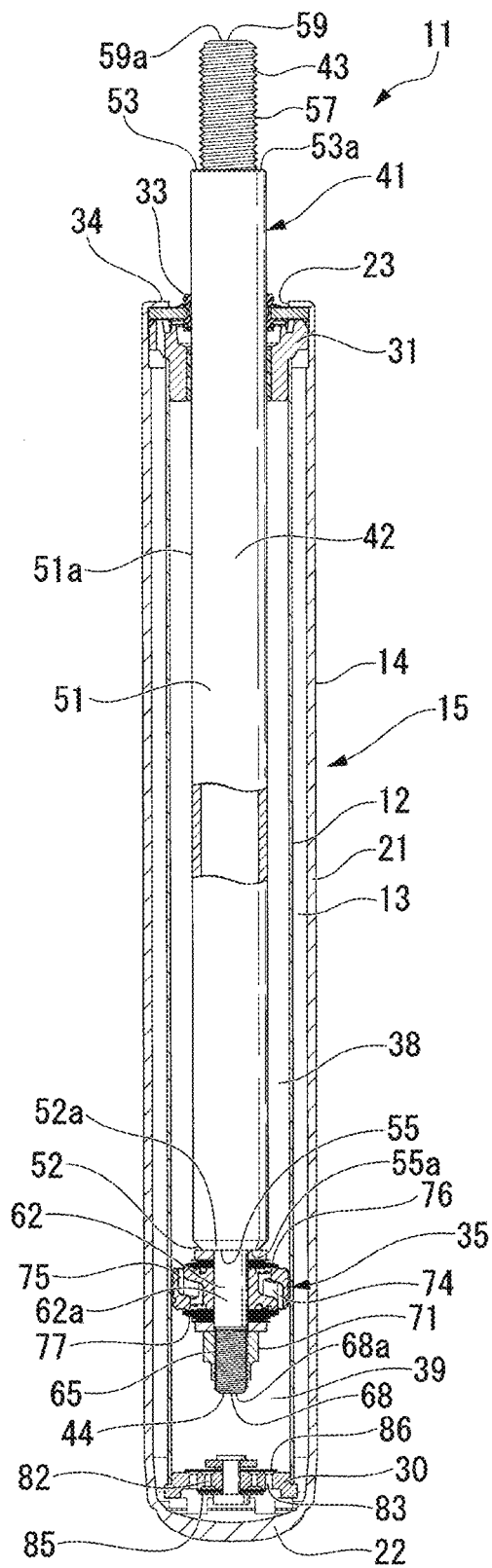
FIG. 1 is a cross-sectional view illustrating a cylinder apparatus including a rod manufactured by a method for manufacturing a rod according to one embodiment of the present invention.

FIG. 1 illustrates a cylinder apparatus 11 including a rod 41 manufactured by the method for manufacturing the rod according to the present embodiment. This cylinder apparatus 11 is a shock absorber used for a suspension apparatus of a vehicle such as an automobile and a railway train, and, more specifically, is a shock absorber used for a strut-type suspension of an automobile. The cylinder apparatus 11 includes a cylindrical inner tube 12 and a bottomed cylindrical outer tube 14. Hydraulic fluid as working fluid is sealingly contained in the inner tube 12. The outer tube 14 is larger in diameter than the inner tube 12 and is provided on the outer peripheral side of the inner tube 12, and defines a reservoir chamber 13 between the inner tube 12 and the outer tube 14. The hydraulic fluid as the working fluid and working gas are sealingly contained in the reservoir chamber 13. The inner tube 12 and the outer tube 14 form a double tube-type cylinder 15. The cylinder apparatus 11 is a hydraulic shock absorber in which oil is used as the hydraulic fluid.

The outer tube 14 is an integrated molded member made of one metallic member, and includes a cylindrical sidewall portion 21, a bottom portion 22, and an opening portion 23. The bottom portion 22 closes one axial end side of the sidewall portion 21. The opening portion 23 is located on the opposite side of the sidewall portion 21 from the bottom portion 22. In other words, the outer tube 14 includes the opening portion 23 on one end side, and includes the bottom portion 22 on the opposite end side. The opening portion 23 of the outer tube 14 on one end side corresponds to the opening portion 23 of the cylinder 15 on one end side. The inner tube 12 is an integrated molded member made of one metallic member, and is cylindrically formed.

The cylinder apparatus 11 includes a disk-shaped base member 30 and an annular rod guide 31 (a sliding contact member). The base member 30 is fitted to one axial end portion of the inner tube 12. The rod guide 31 is fitted to the opposite axial end portion of the inner tube 12 and the opening portion 23 side of the sidewall portion 21 of the outer tube 14 in the axial direction. The inner tube 12 is engaged with the bottom portion 22 of the outer tube 14 via the base member 30, and is engaged with the opening portion 23 side of the sidewall portion 21 of the outer tube 14 via the rod guide 31. The inner tube 12 is radially positioned relative to the outer tube 14 in this state.

The cylinder apparatus 11 includes an annular seal member 33 (the sliding contact member) on the opposite side of the rod guide 31 from the bottom portion 22. This seal member 33 is also fitted to the inner peripheral portion of the opening portion 23 side of the sidewall portion 21 similarly to the rod guide 31. A crimped portion 34 is formed at the opposite end portion of the sidewall portion 21 from the bottom portion 22. The crimped portion 34 is radially inwardly and plastically deformed by curling processing. The seal member 33 is sandwiched between this crimped portion 34 and the rod guide 31. The seal member 33 functions to seal the opening portion 23 side of the outer cylinder 14, i.e., the opening portion 23 side of the cylinder 15.

The cylinder apparatus 11 includes a piston 35 provided in the cylinder 15. The piston 35 is slidably fittedly inserted in the inner tube 12 of the cylinder 15. The piston 35 slidably moves in the inner tube 12 of the cylinder 15, and also divides the inside of the inner tube 12 into two chambers, i.e., a first chamber 38 and a second chamber 39. The first chamber 38 is provided between the piston 35 and the rod guide 31 in the inner tube 12, and the second chamber 39 is provided between the piston 35 and the base member 30 in the inner tube 12. The second chamber 39 in the inner tube 12 is separated from the reservoir chamber 13 by the base member 30 provided on one end side of the inner tube 12. The first chamber 38 and the second chamber 39 are filled with the oil that is the hydraulic fluid, and the reservoir chamber 13 is filled with the gas that is the working gas and the oil that is the hydraulic fluid.

The cylinder apparatus 11 includes the rod 41. One end portion of the rod 41 is coupled with the piston 35 in the cylinder 15, and the opposite end portion of the rod 41 passes through the rod guide 31 and the seal member 33 provided on the opening portion 23 of the cylinder 15 and protrudes from the cylinder 15 via the opening portion 23. The rod 41 slidably contacts the rod guide 31 and the seal member 33. The rod 41 includes a main shaft portion 42 (a first member) at an axially intermediate position, an attachment shaft portion 43 (a second member) at one axial end, and a connection shaft portion 44 (the second member) at the opposite axial end. The attachment shaft portion 43 protrudes from one axial end of the main shaft portion 42 axially outward, and the connection shaft portion 44 protrudes from the opposite axial end of the main shaft portion 42 axially outward. The cylinder apparatus 11 is mounted in such a manner that, for example, the attachment shaft portion 43 of the rod 41 is attached to the vehicle body side and the outer cylinder 14 of the cylinder 15 is attached to the wheel side.

The main shaft portion 42 includes a main outer peripheral portion 51 having an outer peripheral surface 51a shaped like a cylindrical surface. The main outer peripheral portion 51 serves as the main body of the outer peripheral portion of the main shaft portion 42, and a taper portion 52 is formed at the end portion on the connection shaft portion 44 side in the axial direction. The taper portion 52 has an outer peripheral surface 52a formed by a taper surface. The main shaft portion 42 includes a one-end portion 53 that is the end portion thereof on the attachment shaft portion 43 side in the axial direction, and an opposite-end portion 55 that is the end portion thereof on the connection shaft portion 44 side in the axial direction. The one-end portion 53 includes an end surface 53a facing the attachment shaft portion 43 side in the axial direction and extending in a direction perpendicular to the axis. The opposite end portion 55 includes an end surface 55a facing the connection shaft portion 44 side in the axial direction and extending in the direction perpendicular to the axis.

The attachment shaft portion 43 has a smaller outer diameter than the outer peripheral surface 51a of the main shaft portion 42 as a whole. A male screw 57 is formed on the outer peripheral portion of the attachment shaft portion 43. The attachment shaft portion 43 includes a distal end portion 59 that is the end portion on the axially opposite side from the main shaft portion 42, which includes a flat distal end surface 59a facing the axially opposite side from the main shaft portion 42 and extending in the direction perpendicular to the axis.

The connection shaft portion 44 has a smaller outer diameter than the outer peripheral surface 51a of the main shaft portion 42 as a whole. A fitting outer peripheral portion 62 is formed on the outer peripheral portion of the connection shaft portion 44 on the main shaft portion 42 side in the axial direction. The fitting outer peripheral portion 62 has an outer peripheral surface 62a shaped like a cylindrical surface having a constant diameter. A male screw 65 is formed on the outer peripheral portion of the connection shaft portion 44 on the axially opposite side from the main shaft portion 42. The connection shaft portion 44 includes a distal end portion 68 that is the end portion on the axially opposite side from the main shaft portion 42, which includes a flat distal end surface 68a facing the axially opposite side from the main shaft portion 42 and extending in the direction perpendicular to the axis.

The above-described piston 35 is coupled with the rod 41 using a nut 71. More specifically, the piston 35 is fitted to the fitting outer peripheral portion 62 of the connection shaft portion 44 of the rod 41, and the nut 71 is threadably engaged with the male screw 65 of the connection shaft portion 44, by which the piston 35 is attached to the rod 41.

The rod 41 extends outward from the cylinder 15 after passing through the rod guide 31 and the seal member 33 disposed on the opening portion 23 side of the cylinder 15. The main shaft portion 42 of the rod 41 slidably contacts the rod guide 31 and the seal member 33 on the main outer peripheral portion 51 thereof. In other words, the rod guide 31 and the seal member 33 provided at the opening portion 23 of the cylinder 15 slidably contact the outer peripheral surface 51a of the main outer peripheral portion 51 of the rod 41.

Now, the above-described configuration means that the rod 41 slidably contacts the rod guide 31 and the seal member 33 only on the outer peripheral portion 51 of the main shaft portion 42 thereof. Therefore, the attachment shaft portion 43 of the rod 41 slidably contacts neither the rod guide 31 nor the seal member 33. The connection shaft portion 44 of the rod 41 slidably contacts neither the rod guide 31 nor the seal member 33, too.

The rod 41 is guided by the rod guide 31, and axially moves integrally with the piston 35 relative to the cylinder 15. The seal member 33 closes communication between the outer cylinder 14 and the rod 41, thereby restricting the hydraulic fluid in the inner tube 12 and the working gas and the hydraulic fluid in the reservoir chamber 13 from leaking outward. Therefore, the seal member 33 is provided at the opening portion 23 of the cylinder 15, and seals the hydraulic fluid sealingly contained in the cylinder 15.

Passages 74 and 75, which axially extend through the piston 35, are formed at the piston 35. The passages 74 and 75 are configured to be able to establish communication between the first chamber 38 and the second chamber 39. The cylinder apparatus 11 includes an annular disk valve 76 capable of closing the passage 74 by abutting against the piston 35 on the axially opposite side of the piston 35 from the bottom portion 22. The cylinder apparatus 11 includes an annular disk valve 77 capable of closing the passage 75 by abutting against the piston 35 on the bottom portion 22 side of the piston 35 in the axial direction.

When the rod 41 moves to a compression side where the entry amount into the cylinder 15 increases, the piston 35 moves in a direction for narrowing the second chamber 39, and the pressure in the second chamber 39 exceeds the pressure in the first chamber 38 by a predetermined value or greater, the disk valve 76 is supposed to open the passage 74, and generates a damping force at this time. When the rod 41 moves to an extension side where the protrusion amount from the cylinder 15 increases, the piston 35 moves in a direction for narrowing the first chamber 38, and the pressure in the first chamber 38 exceeds the pressure in the second chamber 39 by a predetermined value or greater, the disk valve 77 is supposed to open the passage 75, and generates a damping force at this time.

Passages 82 and 83, which axially extend through the base member 30, are formed at the base member 30. The passages 82 and 83 are configured to be able to establish communication between the second chamber 39 and the reservoir chamber 13. The cylinder apparatus 11 includes an annular disk valve 85 on the bottom portion 22 side of the base member 30 in the axial direction, and includes an annular disk valve 86 on the axially opposite side of the base member 30 from the bottom portion 22. The disk valve 85 can close the passage 82 by abutting against the base member 30. The disk valve 86 can close the passage 83 by abutting against the base member 30.

When the rod 41 moves to the compression side, the piston 35 moves in the direction for narrowing the second chamber 39, and the pressure in the second chamber 39 exceeds the pressure in the reservoir chamber 13 by a predetermined value or greater, the disk valve 85 is supposed to open the passage 82, and generates a damping force at this time. The disk valve 86 is a suction valve that is supposed to open the passage 83 when the rod 41 moves to the extension side, the piston 35 moves to the first chamber 38 side, and the pressure in the second chamber 39 falls below the pressure in the reservoir chamber 13, but causes the hydraulic fluid to flow from the reservoir chamber 13 into the second chamber 39 substantially without generating a damping force.

Next, a method for manufacturing the rod 41 according to the present embodiment will be described.

Figure 2:
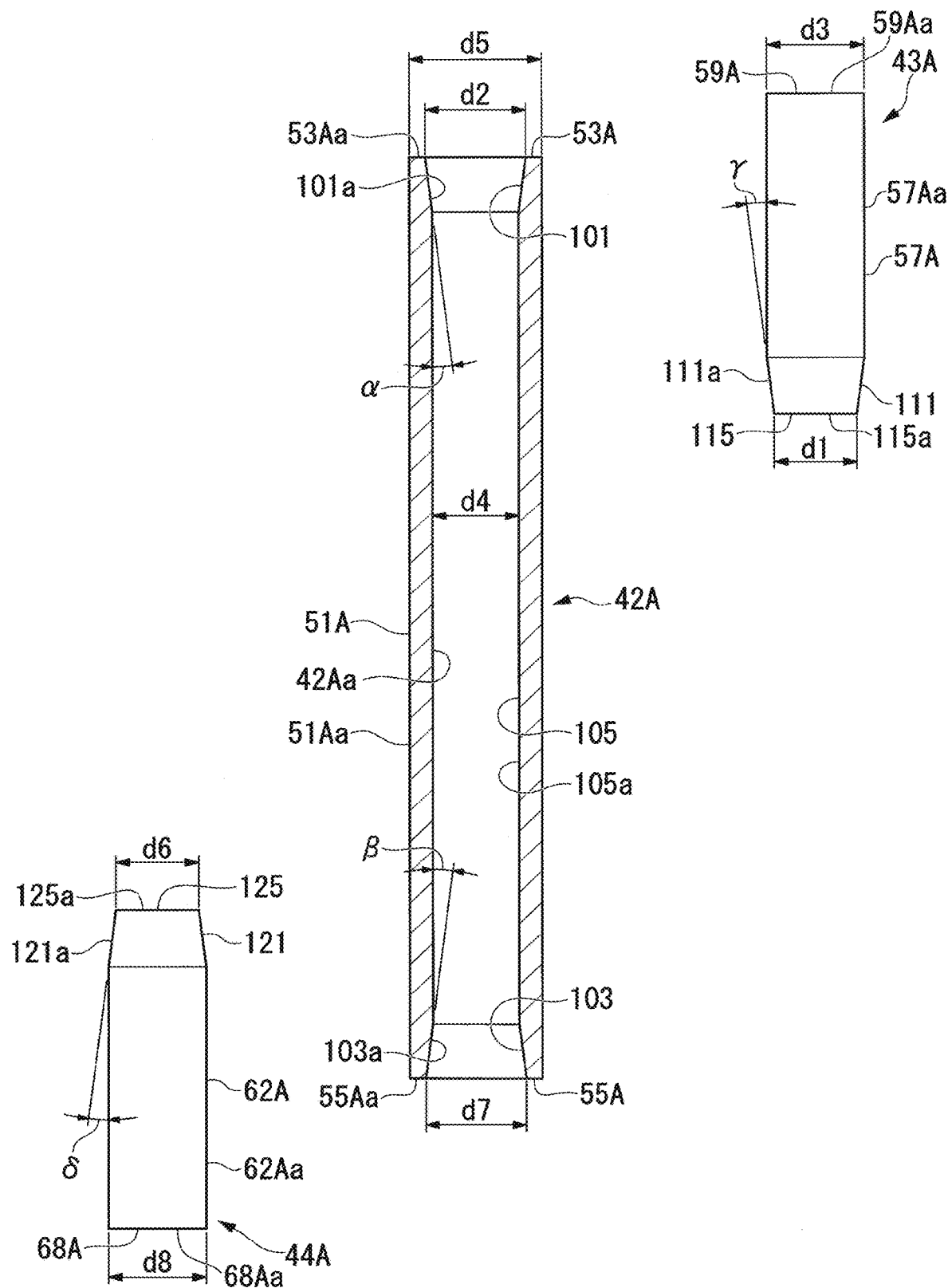
FIG. 2 is an exploded view before joining of the rod manufactured by the method for manufacturing the rod according to the one embodiment of the present invention.

In the rod 41, the main shaft portion 42 thereof illustrated in FIG. 1 is made of a main shaft portion formation member 42A (the first member) illustrated in FIG. 2, the attachment shaft portion 43 thereof illustrated in FIG. 1 is made of an attachment shaft portion formation member 43A (the second member) illustrated in FIG. 2, and the connection shaft portion 44 thereof illustrated in FIG. 1 is made of a connection shaft portion formation member 44A (the second member) illustrated in FIG. 2. The main shaft portion formation member 42A, the attachment shaft portion formation member 43A, and the connection shaft portion formation member 44A are different members, and they are integrated by a welding connection with the aid of friction generated due to a pressure contact. The present embodiment will be described citing the example in which both the attachment shaft portion formation member 43A and the connection shaft portion formation member 44A are integrated with the main shaft portion formation member 42A by the welding connection with the aid of friction, but the technique according to the present embodiment may be applied to the joining of only any one of the attachment shaft portion formation member 43A or the connection shaft portion formation member 44A with the main shaft portion formation member 42A.

The main shaft portion formation member 42A is a cylindrical tube, and is hollow throughout the entire axial length thereof. The attachment shaft portion formation member 43A is supposed to be joined with one axial end portion of the inner peripheral portion of the main shaft portion formation member 42A. A one-end conical hole-shaped portion 101 is formed at one end portion of the inner peripheral portion of the main shaft portion formation member 42A on an axial side where the attachment shaft portion formation member 43A is supposed to be joined. The one-end conical hole-shaped portion 101 includes a tapering inner peripheral surface 101a having a diameter increasing toward the axially outer side. An angle α of the inner peripheral surface 101a of the one-end conical hole-shaped portion 101 with respect to the central axis of the main shaft portion formation member 42A is set to 3° or larger and 12° or smaller.

The connection shaft portion formation member 44A is supposed to be joined with the opposite axial end portion of the inner peripheral portion of the main shaft portion formation member 42A. An opposite-end conical hole-shaped portion 103 is formed at the opposite end portion of the inner peripheral portion of the main shaft portion formation member 42A on an axial side where the connection shaft portion formation member 44A is supposed to be joined. The opposite-end conical hole-shaped portion 103 includes a tapering inner peripheral surface 103a having a diameter increasing toward the axially outer side. An angle β of the inner peripheral surface 103a of the opposite-end conical hole-shaped portion 103 with respect to the central axis of the main shaft portion formation member 42A is set to 3° or larger and 12° or smaller. The angle β is set to an approximately equal angle to the angle α.

The main shaft portion formation member 42A includes an intermediate hole-shaped portion 105 formed between the one-end conical hole-shaped portion 101 and the opposite-end conical hole-shaped portion 103. The intermediate hole-shaped portion 105 includes an inner peripheral surface 105a shaped like a cylindrical surface having a constant diameter. Further, the main shaft portion formation member 42A includes a one-end portion 53A located on one axial end. The one-end portion 53A includes a flat end surface 53Aa facing the axially opposite side of the one-end conical hole-shaped portion 101 from the intermediate hole-shaped portion 105 and extending in the direction perpendicular to the axis. Further, the main shaft portion formation member 42A includes an opposite-end portion 55A located on the opposite axial end. The opposite-end portion 55A includes a flat end surface 55Aa facing the axially opposite side of the opposite-end conical hole-shaped portion 103 from the intermediate hole-shaped portion 105 and extending in the direction perpendicular to the axis. Further, the main shaft portion formation member 42A includes a main outer peripheral portion 51A as the outer peripheral portion thereof. The main outer peripheral portion 51A includes an outer peripheral surface 51Aa shaped like a cylindrical surface having a constant diameter.

Assuming that a reference axis refers to an axis passing through the center of an inner peripheral surface 42Aa of the main shaft portion formation member 42A in cross section perpendicular to the longitudinal direction of the main shaft portion formation member 42A and extending in parallel with the longitudinal direction of the main shaft portion formation member 42A, the one-end conical hole-shaped portion 101 is provided within a range of a predetermined region in the direction along the reference axis that includes the one-end portion 53A out of the one-end portion 53A and the opposite-end portion 55A, which is the pair of end portions of the main shaft portion formation member 42A, and on the inner peripheral side of the main shaft portion formation member 42A. The maximum value of the radius of the inner peripheral surface 101a of the one-end conical hole-shaped portion 101 from the reference axis is smaller than the radius of the outer peripheral surface 51Aa from the reference axis.

Assuming that the reference axis refers to the axis passing through the center of the inner peripheral surface 42Aa of the main shaft portion formation member 42A in cross section perpendicular to the longitudinal direction of the main shaft portion formation member 42A and extending in parallel with the longitudinal direction of the main shaft portion formation member 42A, the opposite-end conical hole-shaped portion 103 is provided within a range of a predetermined region in the direction along the reference axis that includes the opposite-end portion 55A out of the one-end portion 53A and the opposite-end portion 55A, which is the pair of end portions of the main shaft portion formation member 42A, and on the inner peripheral side of the main shaft portion formation member 42A. The maximum value of the radius of the inner peripheral surface 103a of the opposite-end conical hole-shaped portion 103 from the reference axis is smaller than the radius of the outer peripheral surface 51Aa from the reference axis.

On the main shaft portion formation member 42A, the main outer peripheral portion 51A is subjected to machining processing later, and is formed into the main outer peripheral portion 51 of the main shaft portion 42 of the rod 41 illustrated in FIG. 1, which slidably contacts the rod guide 31 and the seal member 33. Therefore, the main shaft portion formation member 42A becomes a portion of the rod 41 that slidably contacts the rod guide 31 and the seal member 33 later. Further, on the main shaft portion formation member 42A, the one-end portion 53A is subjected to machining processing later and is formed into the one-end portion 53 of the main shaft portion 42 of the rod 41 illustrated in FIG. 1, and the opposite-end portion 55A is subjected to machining processing later and is formed into the taper portion 52 and the opposite-end portion 55 of the main shaft portion 42.

The attachment shaft portion formation member 43A is a columnar member, and is solid throughout the entire axial length thereof. A conical outer peripheral portion 111 is formed on the outer peripheral portion of the attachment shaft portion formation member 43A at one end thereof on an axial side that is supposed to be joined with the main shaft portion formation member 42A. The conical outer peripheral portion 111 includes a tapering outer peripheral surface 111a having a diameter reducing toward the axially outer side. An angle γ of the outer peripheral surface 111a of the conical outer peripheral portion 111 with respect to the central axis of the attachment shaft portion formation member 43A is set to 3° or larger and 12° or smaller.

Further, the attachment shaft portion formation member 43A includes a columnar outer peripheral portion 57A formed on the outer peripheral portion thereof except for the conical outer peripheral portion 111. The columnar outer peripheral portion 57A includes an outer peripheral surface 57Aa shaped like a cylindrical surface having a constant diameter. Further, on the attachment shaft portion formation member 43A, an end portion 115 of the conical outer peripheral portion 111 on the opposite side from the columnar outer peripheral portion 57A includes a flat end surface 115a facing the axially opposite side from the columnar outer peripheral portion 57A and extending in the direction perpendicular to the axis, and an end portion 59A of the columnar outer peripheral portion 57A on the opposite side from the conical outer peripheral portion 111 includes a flat end surface 59Aa facing the axially opposite side from the conical outer peripheral portion 111 and extending in the direction perpendicular to the axis.

A minimum outer diameter d1 of the conical outer peripheral portion 111 of the attachment shaft portion formation member 43A is smaller than a maximum inner diameter d2 of the one-end conical hole-shaped portion 101 of the main shaft portion formation member 42A. This configuration allows the conical outer peripheral portion 111 to be inserted in the one-end conical hole-shaped portion 101. Further, a maximum outer diameter d3 of the conical outer peripheral portion 111, i.e., an outer diameter d3 of the columnar outer peripheral portion 57A of the attachment shaft portion formation member 43A is larger than a minimum inner diameter d4 of the one-end conical hole-shaped portion 101, i.e., an inner diameter d4 of the intermediate hole-shaped portion 105 of the main shaft portion formation member 42A. This configuration allows the conical outer peripheral portion 111 to abut against the one-end conical hole-shaped portion 101 when entering into the one-end conical hole-shaped portion 101, thereby being restricted from entering it more than that.

Further, the maximum outer diameter d3 of the conical outer peripheral portion 111, i.e., the outer diameter d3 of the columnar outer peripheral portion 57A of the attachment shaft portion formation member 43A is smaller than an outer diameter d5 of the main shaft portion formation member 42A, i.e., an outer diameter d5 of the main outer peripheral portion 51A. In this manner, the attachment shaft portion formation member 43A is formed so as to include the columnar outer peripheral portion 57A having the outer diameter dimension d3 smaller than the outer diameter dimension d5 of the main shaft portion formation member 42A, and the conical outer peripheral portion 111 having the outer diameter equal to or larger than d1 and equal to or smaller than d3, which are smaller than the outer diameter dimension d5 of the main shaft portion formation member 42A.

On the attachment shaft portion formation member 43A, the columnar outer peripheral portion 57A is subjected to machining processing later, and is formed into the male screw 57 of the attachment shaft portion 43 of the rod 41 illustrated in FIG. 1, which does not slidably contact the rod guide 31 and the seal member 33. Therefore, the attachment shaft portion formation member 43A becomes a portion of the rod 41 that does not slidably contact the rod guide 31 and the seal member 33 later. Further, on the attachment shaft portion formation member 43A, the end portion 59A is subjected to machining processing later, and is formed into the distal end portion 59 of the attachment shaft portion 43 of the rod 41.

Then, an angle γ of the conical outer peripheral portion 111 with respect to the central axis of the attachment shaft portion formation member 43A is equivalent to the angle α of the one-end conical hole-shaped portion 101 with respect to the central axis of the main shaft portion formation member 42A, and the axial length of the conical outer peripheral portion 111 is equivalent to the axial length of the one-end conical hole-shaped portion 101. Then, the maximum outer diameter d3 of the conical outer peripheral portion 111 is larger than the maximum inner diameter d2 of the one-end conical hole-shaped portion 101 by a predetermined amount. In other words, the dimensional relationship is set in such a manner that the conical outer peripheral portion 111 protrudes outward beyond the end surface 53Aa of the one-end portion 53A by a predetermined amount (for example, 1 mm) when the attachment shaft portion formation member 43A is inserted into the main shaft portion formation member 42A until the conical outer peripheral portion 111 is stopped by abutting against the one-end conical hole-shaped portion 101.

The connection shaft portion formation member 44A is a columnar member, and is solid throughout the entire axial length thereof. A conical outer peripheral portion 121 is formed on the outer peripheral portion of the connection shaft portion formation member 44A at one end thereof on an axial side that is supposed to be joined with the main shaft portion formation member 42A. The conical outer peripheral portion 121 includes a tapering outer peripheral surface 121a having a diameter reducing toward the axially outer side. An angle δ of the outer peripheral surface 121a of the conical outer peripheral portion 121 with respect to the central axis of the connection shaft portion formation member 44A is set to 3° or larger and 12° or smaller. The angle δ is set to an approximately equal angle to the angle γ.

Further, a columnar outer peripheral portion 62A is formed on the outer peripheral portion of the connection shaft portion formation member 44A except for the conical outer peripheral portion 121. The columnar outer peripheral portion 62A includes an outer peripheral surface 62Aa shaped like a cylindrical surface having a constant diameter. Further, on the connection shaft portion formation member 44A, an end portion 125 of the conical outer peripheral portion 121 on the opposite side from the columnar outer peripheral portion 62A includes a flat end surface 125a facing the axially opposite side from the columnar outer peripheral portion 62A and extending in the direction perpendicular to the axis, and an end portion 68A of the columnar outer peripheral portion 62A on the opposite side from the conical outer peripheral portion 121 includes a flat end surface 68Aa facing the axially opposite side from the conical outer peripheral portion 121 and extending in the direction perpendicular to the axis.

A minimum outer diameter d6 of the conical outer peripheral portion 121 of the connection shaft portion formation member 44A is smaller than a maximum inner diameter d7 of the opposite-end conical hole-shaped portion 103 of the main shaft portion formation member 42A. This configuration allows the conical outer peripheral portion 121 to be inserted in the opposite-end conical hole-shaped portion 103. Further, a maximum outer diameter d8 of the conical outer peripheral portion 121, i.e., an outer diameter d8 of the columnar outer peripheral portion 62A of the connection shaft portion formation member 44A is larger than the minimum inner diameter d4 of the opposite-end conical hole-shaped portion 103, i.e., the inner diameter d4 of the intermediate hole-shaped portion 105 of the main shaft portion formation member 42A. This configuration allows the conical outer peripheral portion 121 to abut against the opposite-end conical hole-shaped portion 103 when entering into the opposite-end conical hole-shaped portion 103, thereby being restricted from entering it more than that.

Further, the maximum outer diameter d8 of the conical outer peripheral portion 121, i.e., the outer diameter d8 of the columnar outer peripheral portion 62A of the connection shaft portion formation member 44A is smaller than the outer diameter d5 of the main shaft portion formation member 42A, i.e., the outer diameter d5 of the main outer peripheral portion 51A. In this manner, the connection shaft portion formation member 44A is formed so as to include the columnar outer peripheral portion 62A having the outer diameter dimension d8 smaller than the outer diameter dimension d5 of the main shaft portion formation member 42A, and the conical outer peripheral portion 121 having the outer diameter equal to or larger than d6 and equal to or smaller than d8, which are smaller than the outer diameter dimension d5 of the main shaft portion formation member 42A.

On the connection shaft portion formation member 44A, the columnar outer peripheral portion 62A is subjected to machining processing later, and is formed into the fitting outer peripheral portion 62 and the male screw 65 of the connection shaft portion 44 of the rod 41 illustrated in FIG. 1, which do not slidably contact the rod guide 31 and the seal member 33. Therefore, the connection shaft portion formation member 44A becomes a portion of the rod 41 that does not slidably contact the rod guide 31 and the seal member 33 later. Further, on the connection shaft portion formation member 44A, the end portion 68A is subjected to machining processing later, and is formed into the distal end portion 68 of the connection shaft portion 44 of the rod 41.

Then, the angle δ of the conical outer peripheral portion 121 with respect to the central axis of the connection shaft portion formation member 44A is equivalent to the angle β of the opposite-end conical hole-shaped portion 103 with respect to the central axis of the main shaft portion formation member 42A, and the axial length of the conical outer peripheral portion 121 is equivalent to the axial length of the opposite-end conical hole-shaped portion 103. Then, the maximum outer diameter d8 of the conical outer peripheral portion 121 is larger than the maximum inner diameter d7 of the opposite-end conical hole-shaped portion 103 by a predetermined amount. In other words, the dimensional relationship is set in such a manner that the conical outer peripheral portion 121 protrudes outward beyond the end surface 55Aa of the opposite-end portion 55A by a predetermined amount (for example, 1 mm) when the connection shaft portion formation member 44A is inserted into the main shaft portion formation member 42A until the conical outer peripheral portion 121 is stopped by abutting against the opposite-end conical hole-shaped portion 103.

Figure 3:
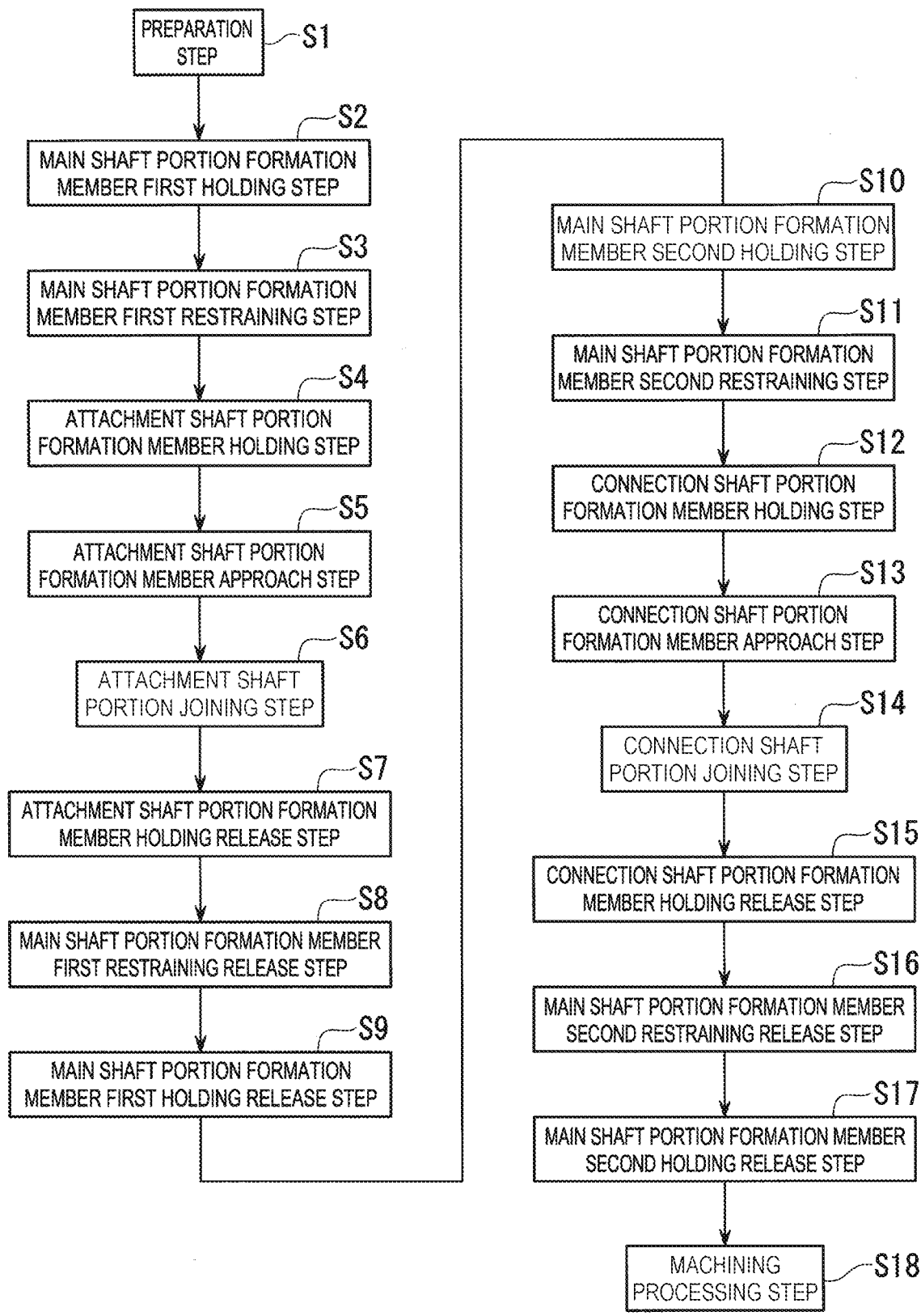
FIG. 3 illustrates steps indicating the method for manufacturing the rod according to the one embodiment of the present invention.

The method for manufacturing the rod 41 according to the present embodiment includes a preparation step S1 illustrated in FIG. 3, which prepares these main shaft portion formation member 42A, attachment shaft portion formation member 43A, and connection shaft portion formation member 44A.

Figure 4:
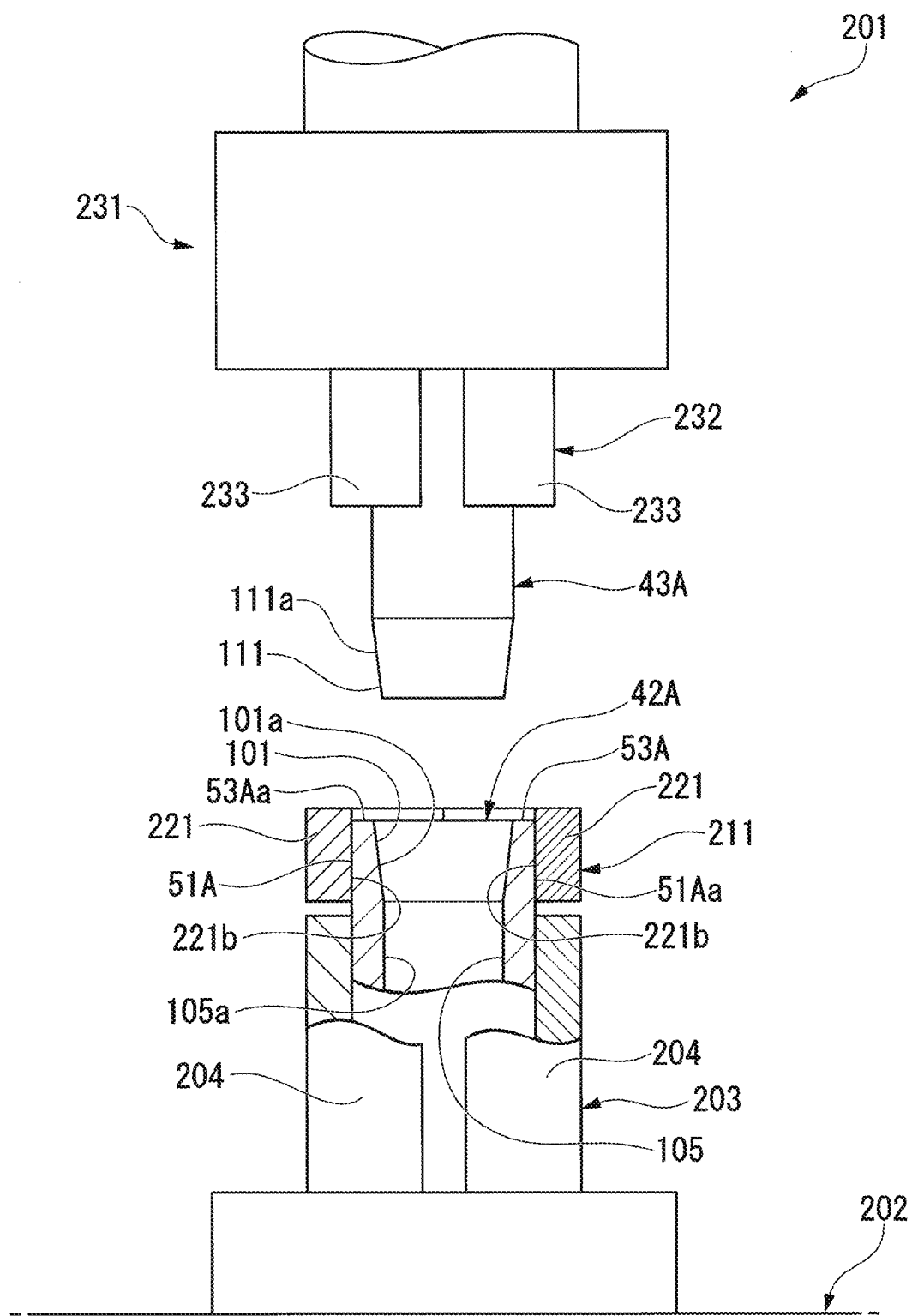
FIG. 4 is a front view illustrating main portions of a friction pressure welding machine used in the method for manufacturing the rod according to the one embodiment of the present invention with a part therefore indicated in cross section.

The manufacturing method according to the present embodiment is performed with use of a friction pressure welding machine 201 illustrated in FIG. 4. The friction pressure welding machine 201 includes a fixation-side chuck 203, a restraining member 211, a rotational head 231, and a rotation-side chuck 232. The fixation-side chuck 203 is non-rotatable relative to a main body 202 set up on a not-illustrated floor. The restraining member 211 is non-rotatable relative to the main body 202. The rotational head 231 is rotatable relative to the main body 202. The rotation-side chuck 232 rotates relative to the main body 202 integrally with the rotational head 231. FIG. 4 illustrates an upright apparatus, but may be a sideways apparatus by being rotated by 90°.

The manufacturing method according to the present embodiment includes a main shaft portion formation member first holding step S2 of relatively non-rotatably fixing the main shaft portion formation member 42A to the fixation-side chuck 203 of the friction pressure welding machine 201, which is performed after the preparation step S1. The fixation-side chuck 203 includes a plurality of claw portions 204. At the time of the main shaft portion formation member first holding step S2, the main shaft portion formation member 42A is supposed to be axially and radially positioned and held by the fixation-side chuck 203 in such a manner that the one-end portion 53A side axially protrudes from the fixation-side chuck 203, and the main outer peripheral portion 51A of the portion axially positionally overlapping the intermediate hole-shaped portion 105 is supposed to abut against the fixation-side chuck 203.

The manufacturing method according to the present embodiment includes a main shaft portion formation member first restraining step S3, which places the restraining member 211 of the friction pressure welding machine 201 into abutment with the main outer peripheral portion 51A in a predetermined range on the one-end portion 53A side of the main shaft portion formation member 42A that protrudes from the fixation-side chuck 203, which is performed after the main shaft portion formation member first holding step S2. At this time, the restraining member 211 is placed into abutment with the main outer peripheral portion 51A in the predetermined range positionally overlapping the one-end conical hole-shaped portion 101 in the axial direction of the main shaft portion formation member 42A so as not to interfere with the fixation-side chuck 203.

More specifically, the restraining member 211 covers the entire surface of the main outer peripheral portion 51A in the range positionally overlapping the entire range of the one-end conical hole-shaped portion 101 in the axial direction of the main shaft portion formation member 42A. In other words, the restraining member 211 covers the entire surface of the main outer peripheral portion 51A in the range between the end surface 53Aa of the one-end portion 53A facing opposite from the intermediate hole-shaped portion 105 and the boundary position between the inner peripheral surface 101a of the one-end conical hole-shaped portion 101 and the inner peripheral surface 105a of the intermediate hole-shaped portion 105 in the axial direction of the main shaft portion formation member 42A.

The restraining member 211 includes a pair of semi-cylindrical divided pieces 221 disposed on the both radial sides of the main shaft portion formation member 42A positioned and fixed on the fixation-side chuck 203. The pair of divided pieces 221 is disposed at positions different by 180° from each other with respect to the main shaft portion formation member 42A held by the fixation-side chuck 203, and is provided on the friction pressure welding machine 201 so as to move forward and backward along the radial direction of the main shaft portion formation member 42A relative to the main shaft portion formation member 42A held by the fixation-side chuck 203.

Figure 5:
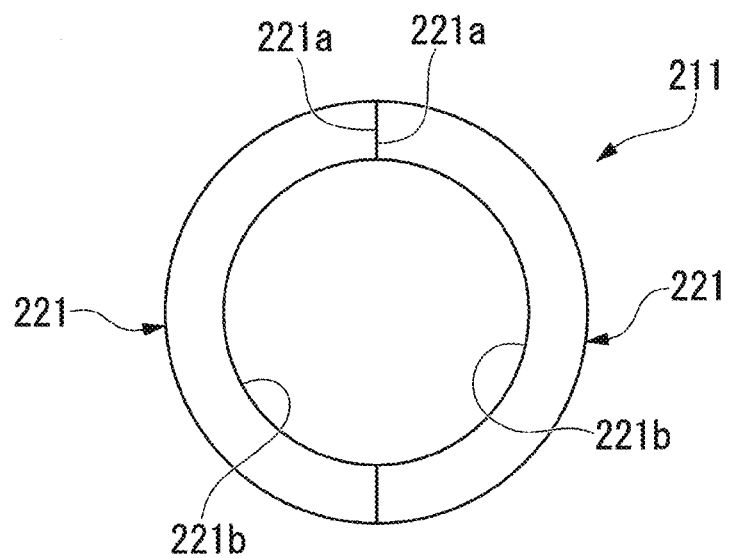
FIG. 5 is a front view illustrating a restraining member used in the method for manufacturing the rod according to the one embodiment of the present invention.
Figure 6:
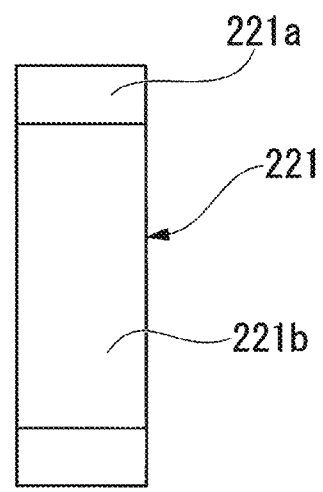
FIG. 6 is a side view illustrating a divided piece of the retraining member used in the method for manufacturing the rod according to the one embodiment of the present invention.

As illustrated in FIG. 5, the pair of divided pieces 221 abuts against each other in such a manner that flat abutment faces 221a thereof are brought into planar contact with each other, by which the restraining member 211 defines a cylindrical shape as a whole. As illustrated in FIGS. 5 and 6, the divided piece 221 includes a restraining surface 221b formed by a semi-cylindrical surface on the radially inner side thereof. The radius of this restraining surface 221b is equivalent to or slightly larger than the radius of the outer peripheral surface 51Aa of the main shaft portion formation member 42A illustrated in FIG. 4.

In the main shaft portion formation member first restraining step S3, the pair of divided pieces 221 places their respective restraining surfaces 221b into planar contact with the outer peripheral surface 51Aa of the main shaft portion formation member 42A, and also places their respective abutment surfaces 221a into planar contact with each other. As a result, the restraining member 211 is brought into abutment with the outer peripheral surface 51Aa of the main shaft portion formation member 42A throughout the entire circumference. Due to this abutment, the restraining member 211 restrains a portion of the main shaft portion formation member 42A in a predetermined range that axially positionally overlaps the pair of restraining surfaces 221b so as to prevent this portion from being deformed radially outward. In other words, the main shaft portion formation member first restraining step S3 is a step of setting the restraining member 211, which prevents the predetermined range on the one-end portion 53A side in the axial direction of the main shaft portion formation member 42A from being deformed radially outward throughout the entire circumference of the outer peripheral surface 51Aa of the main shaft portion formation member 42A, so as to face the outer peripheral surface 51Aa of the main shaft portion formation member 42A.

The manufacturing method according to the present embodiment includes an attachment shaft portion formation member holding step S4 of axially and radially positioning and relatively non-rotatably fixing the attachment shaft portion formation member 43A on the rotation-side chuck 232 of the friction pressure welding machine 201, which is performed after the main shaft portion formation member first restraining step S3. The rotation-side chuck 232 includes a plurality of claw portions 233. The attachment shaft portion formation member holding step S4 may be performed before the main shaft portion formation member first holding step S2 or may be performed between the main shaft portion formation member first holding step S2 and the main shaft portion formation member first restraining step S3.

Figure 7:
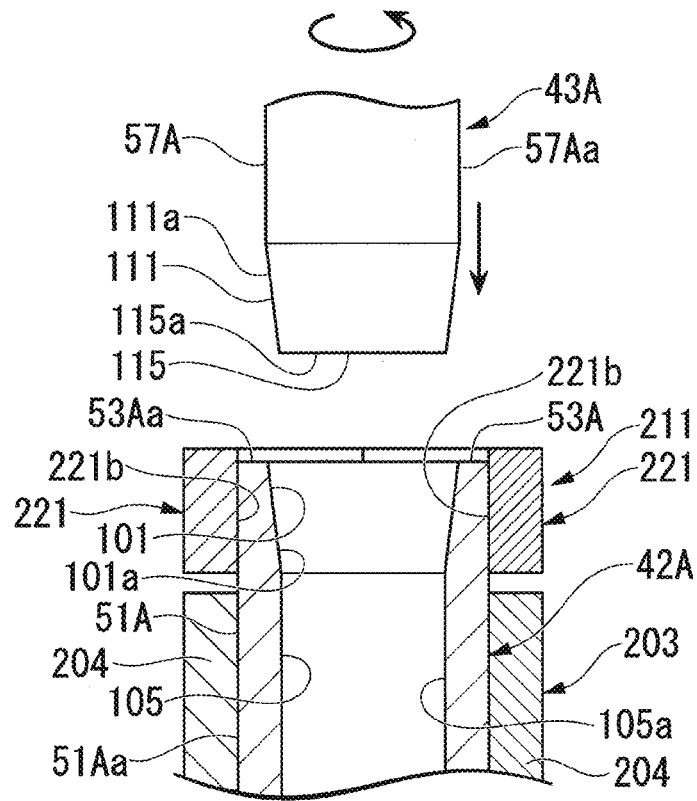
FIG. 7 is a cross-sectional view illustrating an attachment shaft portion formation member approach step in the method for manufacturing the rod according to the one embodiment of the present invention.

The manufacturing method according to the present embodiment includes an attachment shaft portion formation member approach step S5 illustrated in FIG. 3, which moves the inner peripheral surface 101a of the one-end conical hole-shaped portion 101 of the main shaft portion formation member 42A and the outer peripheral surface 111a of the conical outer peripheral portion 111 of the attachment shaft portion formation member 43A closer to each other while rotating the attachment shaft portion formation member 43A as illustrated in FIG. 7 on the friction pressure welding machine 201, after the main shaft portion formation member first holding step S2, the main shaft portion formation member first restraining step S3, and the attachment shaft portion formation member holding step S4. The present embodiment has been described citing the method that moves the attachment shaft portion formation member 43A closer to the main shaft portion formation member 42A while rotating the attachment shaft portion formation member 43A, but may be configured to move the main shaft portion formation member 42A closer to the attachment shaft portion formation member 43A while rotating the main shaft portion formation member 42A. This case means that the restraining member 211 is also moved while being rotated integrally with the main shaft portion formation member 42A.

Figure 8:
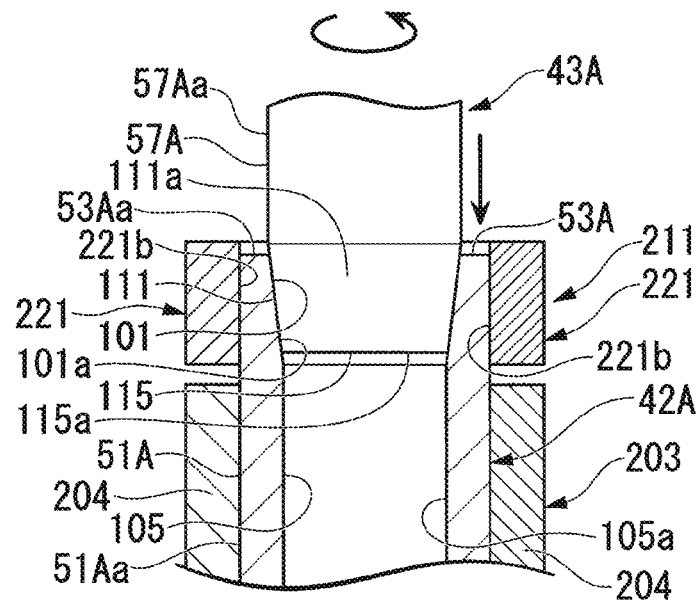
FIG. 8 is a cross-sectional view illustrating a state immediately before an attachment shaft portion joining step in the method for manufacturing the rod according to the one embodiment of the present invention.

After placing the inner peripheral surface 101a of the one-end conical hole-shaped portion 101 of the main shaft portion formation member 42A and the outer peripheral surface 111a of the conical outer peripheral portion 111 of the attachment shaft portion formation member 43A into contact with each other as illustrated in FIG. 8 by the attachment shaft portion formation member approach step S5 performed by the friction pressure welding machine 201, the manufacturing method according to the present embodiment performs an attachment shaft portion joining step S6 illustrated in FIG. 3, which places the main shaft portion formation member 42A and the attachment shaft portion formation member 43A into pressure contact with each other by relatively axially pressing in the main shaft portion formation member 42A and the attachment shaft portion formation member 43A by a predetermined amount while keeping the attachment shaft portion formation member 43A in the rotating state, thereby joining the main shaft portion formation member 42A and the attachment shaft portion formation member 43A by the welding connection using frictional heat generated at this time.

At this time, the friction pressure welding machine 201 presses the attachment shaft portion formation member 43A into the fixed main shaft portion formation member 42A while rotating the attachment shaft portion formation member 43A. At this time, the restraining member 211 restrains the portion axially positionally overlapping the one-end conical hole-shaped portion 101 of the main outer peripheral portion 51A of the main shaft portion formation member 42A from the radially outer side. As illustrated in FIG. 8, when the conical outer peripheral portion 111 contacts the one-end conical hole-shaped portion 101, the conical outer peripheral portion 111 is supposed to protrude beyond the end surface 53Aa of the one-end portion 53A axially outward by the predetermined amount (for example, 1 mm), and this predetermined amount is handled as a pressing amount and the attachment shaft portion formation member 43A is axially pressed into the main shaft portion formation member 42A by this pressing amount in the attachment shaft portion joining step S6. Immediately after being pressed in by this pressing amount, the attachment shaft portion formation member 43A stops being rotated and is held with a predetermined axial force applied to the attachment shaft portion formation member 43A for a predetermined time. This is because a pulling force is generated between the attachment shaft portion formation member 43A and the main shaft portion formation member 42A when the temperature reduces, and therefore it is helpful to apply an axial force enough to counteract it.

Figure 9:
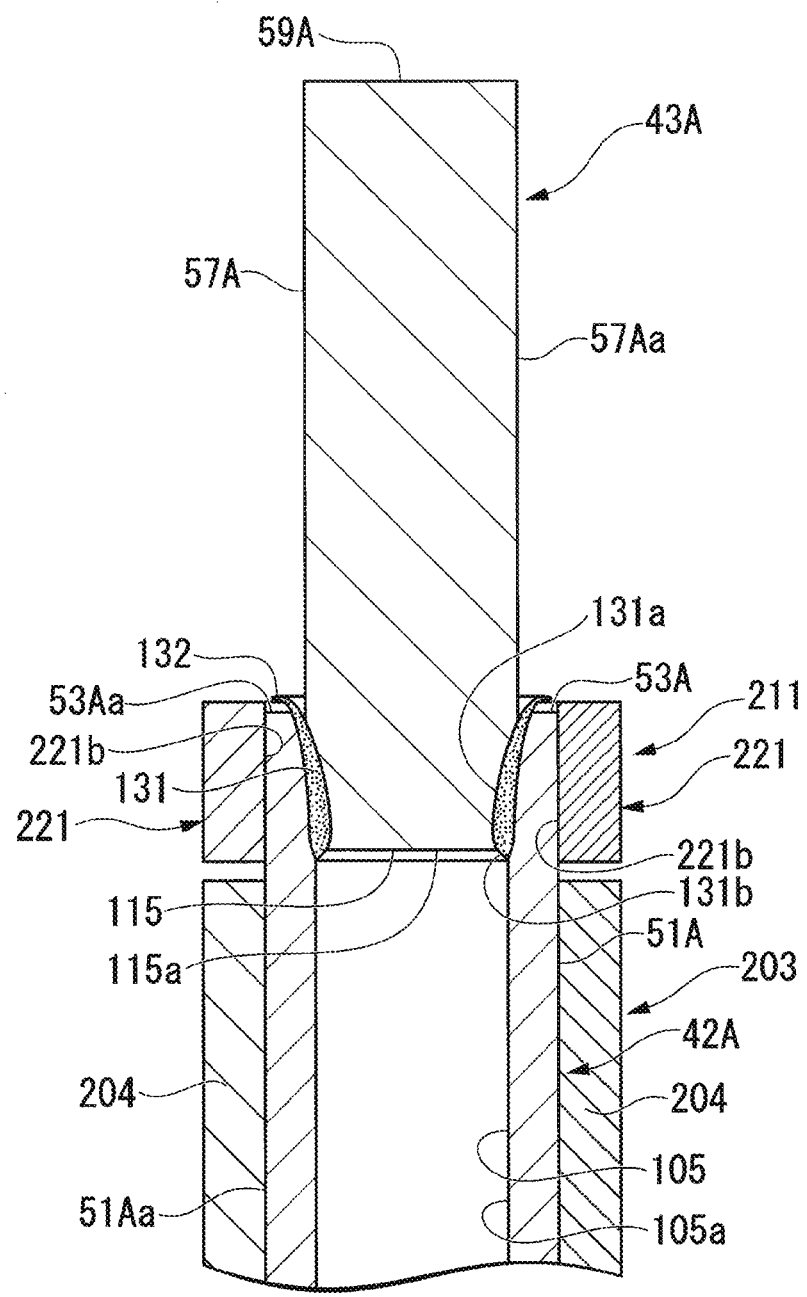
FIG. 9 is a cross-sectional view illustrating a state after the attachment shaft portion joining step in the method for manufacturing the rod according to the one embodiment of the present invention.

Then, after the material is softened due to the frictional heat and is stirred, the inner peripheral portion of the one-end conical hole-shaped portion 101 of the main shaft portion formation member 42A and the outer peripheral portion of the conical outer peripheral portion 111 of the attachment shaft portion formation member 43A are solidified and integrated, thereby being formed into a welded portion 131 as illustrated in FIG. 9. The welded portion 131 is formed between the inner peripheral portion of the main shaft portion formation member 42A and the outer peripheral portion of the attachment shaft portion formation member 43A. The welded portion 131 is shaped approximately in conformity with the shapes of the one-end conical hole-shaped portion 101 and the conical outer peripheral portion 111 illustrated in FIG. 8, and has a tubular shape flaring toward the one-end portion 53A side of the main shaft portion formation member 42A. The welded portion 131 includes a burr 132 protruding axially outward from the end surface 53Aa of the one-end portion 53A of the main shaft portion formation member 42A and protruding radially outward from the outer peripheral surface 57Aa of the columnar outer peripheral portion 57A of the attachment shaft portion formation member 43A.

Now, the welded portion 131 includes a welded main body portion 131a, a welded margin portion 131b, and the burr 132. The welded main body portion 131a is joined with both the main shaft portion formation member 42A and the attachment shaft portion formation member 43A while axially positionally overlapping both of them. The welded margin portion 131b is located on the intermediate hole-shaped portion 105 side in the axial direction with respect to the welded main body portion 131a and axially positionally overlaps only the main shaft portion formation member 42A out of the main shaft portion formation member 42A and the attachment shaft portion formation member 43A.

The welded main body portion 131a serves as a portion radially joining the main shaft portion formation member 42A and the attachment shaft portion formation member 43A by the attachment shaft portion joining step S6, which joins the main shaft portion formation member 42A and the attachment shaft portion formation member 43A by the welding connection. The welded main body portion 131a is a portion of the welded portion 131 between the end surface 53Aa of the one-end portion 53A of the main shaft portion formation member 42A and the end surface 115a of the end portion 115 of the attachment shaft portion formation member 43A. The axial range of the welded main body portion 131a includes a portion where the main shaft portion formation member 42A, the attachment shaft portion formation member 43A, and the welded main body portion 131a exist without any space over the entire surface in cross section perpendicular to the central axis of the main shaft portion formation member 42A.

The welded margin portion 131b is a range where the main shaft portion formation member 42A and the attachment shaft portion formation member 43A are not radially joined with each other by the attachment shaft portion joining step S6. In other words, the welded margin portion 131b is an axial range where the attachment shaft portion formation member 43A does not exist although the welded portion 131 and the main shaft portion formation member 42A exist. The welded margin portion 131b is a portion of the welded portion 131 located on the opposite side from the end surface 53Aa with respect to the end surface 115a of the end portion 115 of the attachment shaft portion formation member 43A.

Now, in the above-described main shaft portion formation member first restraining step S3, the axial range restrained by the restraining member 211 where the pair of divided pieces 221 places their respective restraining surfaces 221b in planar contact with the outer peripheral surface 51Aa of the main shaft portion formation member 42A is set so as to include at least the entire axial range of this welded main body portion 131a. In other words, the axial range restrained by the restraining member 211 is set so as to include at least the entire range from the end surface 53Aa of the one-end portion 53A of the main shaft portion formation member 42A to the position of the end surface 115a of the end portion 115 of the attachment shaft portion formation member 43A after the attachment shaft portion joining step S6. Due to this setting, the restraining member 211 prevents the range of the main shaft portion formation member 42A that axially positionally overlaps at least the welded main body portion 131a from being deformed radially outward by being softened due to the frictional heat in the attachment shaft portion joining step S6, by physically restraining this portion.

The manufacturing method according to the present embodiment includes an attachment shaft portion formation member holding release step S7 of releasing the holding of the attachment shaft portion formation member 43A by the rotation-side chuck 232 of the friction pressure welding machine 201, which is performed after this attachment shaft portion joining step S6. Further, the manufacturing method according to the present embodiment includes a main shaft portion formation member first restraining release step S8 of releasing the restraint of the main shaft portion formation member 42A by the restraining member 211 of the friction pressure welding machine 201, which is performed after this attachment shaft portion formation member holding release step S7. Further, the manufacturing method according to the present embodiment includes a main shaft portion formation member first holding release step S9 of releasing the holding of the main shaft portion formation member 42A by the fixation-side chuck 203 of the friction pressure welding machine 201, which is performed after the main shaft portion formation member first restraining release step S8. The order of the attachment shaft portion formation member holding release step S7, the main shaft portion formation member first restraining release step S8, and the main shaft portion formation member first holding release step S9 is not limited thereto, and these steps may be performed in any order or may be performed in parallel concurrently.

Figure 10:
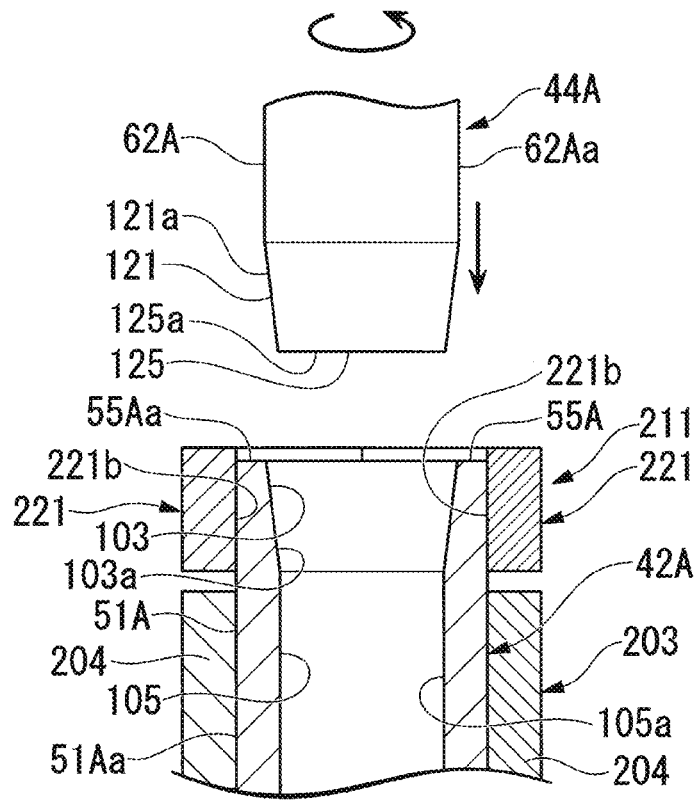
FIG. 10 is a cross-sectional view illustrating a connection shaft portion formation member approach step in the method for manufacturing the rod according to the one embodiment of the present invention.

The manufacturing method according to the present embodiment includes a main shaft portion formation member second holding step S10 of relatively non-rotatably fixing the main shaft portion formation member 42A to the fixation-side chuck 203 of the friction pressure welding machine 201 illustrated in FIG. 10 after axially turning the main shaft portion formation member 42A upside down from the above-described orientation, which is performed after the main shaft portion formation member first holding release step S9. At the time of the main shaft portion formation member second holding step S10, the main shaft portion formation member 42A is supposed to be axially and radially positioned and held by the fixation-side chuck 203 in such a manner that the opposite-end portion 55A side axially protrudes from the fixation-side chuck 203, and the main outer peripheral portion 51A of the portion axially positionally overlapping the intermediate hole-shaped portion 105 is supposed to abut against the fixation-side chuck 203.

The manufacturing method according to the present embodiment includes a main shaft portion formation member second restraining step S11 of placing the restraining member 211 of the friction pressure welding machine 201 into abutment with the main outer peripheral portion 51A in a predetermined range on the opposite-end portion 55A side of the main shaft portion formation member 42A that protrudes from the fixation-side chuck 203, which is performed after the main shaft portion formation member second holding step S10. At this time, the restraining member 211 is placed into abutment with the main outer peripheral portion 51A in the predetermined range positionally overlapping the opposite-end conical hole-shaped portion 103 in the axial direction of the main shaft portion formation member 42A so as not to interfere with the fixation-side chuck 203.

More specifically, the restraining member 211 covers the entire surface of the main outer peripheral portion 51A in the range positionally overlapping the entire range of the opposite-end conical hole-shaped portion 103 in the axial direction of the main shaft portion formation member 42A. In other words, the restraining member 211 covers the entire surface of the main outer peripheral portion 51A in the range between the end surface 55Aa of the opposite-end portion 55A facing opposite from the intermediate hole-shaped portion 105 and the boundary position between the inner peripheral surface 103a of the opposite-end conical hole-shaped portion 103 and the inner peripheral surface 105a of the intermediate hole-shaped portion 105 in the axial direction of the main shaft portion formation member 42A.

In the main shaft portion formation member second restraining step S11, the pair of divided pieces 221 places their respective restraining surfaces 221b into planar contact with the outer peripheral surface 51Aa of the main shaft portion formation member 42A, and also places their respective abutment surfaces 221a into planar contact with each other. As a result, the restraining member 211 is brought into abutment with the outer peripheral surface 51Aa of the main shaft portion formation member 42A throughout the entire circumference. Due to this abutment, the restraining member 211 restrains a portion of the main shaft portion formation member 42A in a predetermined range that axially positionally overlaps the pair of restraining surfaces 221b so as to prevent this portion from being deformed radially outward. In other words, the main shaft portion formation member second restraining step S11 is a step of setting the restraining member 211, which prevents the predetermined range on the opposite-end portion 55A side in the axial direction of the main shaft portion formation member 42A from being deformed radially outward throughout the entire circumference of the outer peripheral surface 51Aa of the main shaft portion formation member 42A, so as to face the outer peripheral surface 51Aa of the main shaft portion formation member 42A.

The manufacturing method according to the present embodiment includes a connection shaft portion formation member holding step S12 of axially and radially positioning and relatively non-rotatably fixing the connection shaft portion formation member 44A on the rotation-side chuck 232 of the friction pressure welding machine 201, which is performed after the main shaft portion formation member second restraining step S11. The connection shaft portion formation member holding step S12 may be performed before the main shaft portion formation member second holding step S10 or may be performed between the main shaft portion formation member second holding step S10 and the main shaft portion formation member second restraining step S11.

The manufacturing method according to the present embodiment includes a connection shaft portion formation member approach step S13 illustrated in FIG. 3, which moves the inner peripheral surface 103a of the opposite-end conical hole-shaped portion 103 of the main shaft portion formation member 42A and the outer peripheral surface 121a of the conical outer peripheral portion 121 of the connection shaft portion formation member 44A closer to each other while rotating the connection shaft portion formation member 44A as illustrated in FIG. 10 on the friction pressure welding machine 201, after the main shaft portion formation member second holding step S10, the main shaft portion formation member second restraining step S11, and the connection shaft portion formation member holding step S12. The manufacturing method may be performed so as to move the main shaft portion formation member 42A closer to the connection shaft portion formation member 44A while rotating the main shaft portion formation member 42A. This case means that the restraining member 211 is also moved while being rotated integrally with the main shaft portion formation member 42A.

Figure 11:
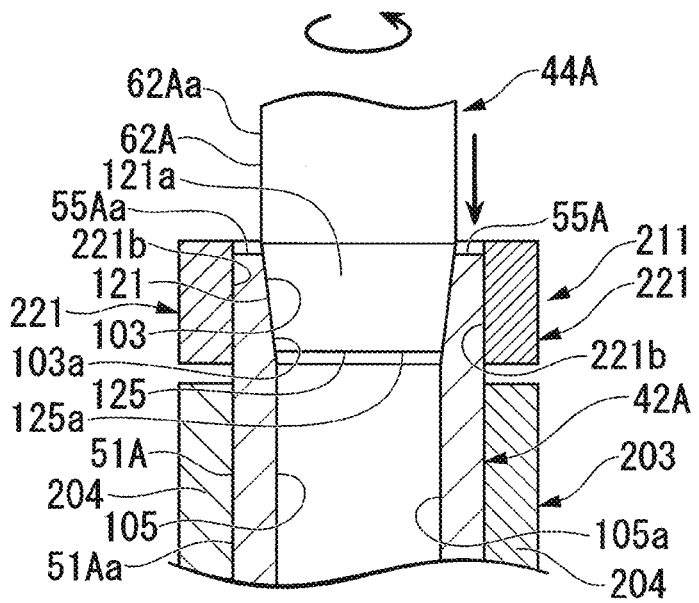
FIG. 11 is a cross-sectional view illustrating a state immediately before a connection shaft portion joining step in the method for manufacturing the rod according to the one embodiment of the present invention.

After placing the inner peripheral surface 103a of the opposite-end conical hole-shaped portion 103 of the main shaft portion formation member 42A and the outer peripheral surface 121a of the conical outer peripheral portion 121 of the connection shaft portion formation member 44A into contact with each other as illustrated in FIG. 11 by the connection shaft portion formation member approach step S13 performed by the friction pressure welding machine 201, the manufacturing method according to the present embodiment performs a connection shaft portion joining step S14 illustrated in FIG. 3, which places the main shaft portion formation member 42A and the connection shaft portion formation member 44A into pressure contact with each other by relatively axially pressing in the main shaft portion formation member 42A and the connection shaft portion formation member 44A by a predetermined amount while keeping the connection shaft portion formation member 44A in the rotating state, thereby joining the main shaft portion formation member 42A and the connection shaft portion formation member 44A by the welding connection using frictional heat generated at this time.

In this step, the friction pressure welding machine 201 presses the connection shaft portion formation member 44A into the fixed main shaft portion formation member 42A while rotating the connection shaft portion formation member 44A. At this time, the restraining member 211 restrains the portion axially overlapping the opposite-end conical hole-shaped portion 103 of the main outer peripheral portion 51A of the main shaft portion formation member 42A from the radially outer side. As illustrated in FIG. 11, when the conical outer peripheral portion 121 contacts the opposite-end conical hole-shaped portion 103, the conical outer peripheral portion 121 is supposed to protrude beyond the end surface 55Aa of the opposite-end portion 55A axially outward by the predetermined amount (for example, 1 mm), and this predetermined amount is handled as a pressing amount and the connection shaft portion formation member 44A is axially pressed into the main shaft portion formation member 42A by this pressing amount in the connection shaft portion joining step S14. Immediately after being pressed in by this pressing amount, the connection shaft portion formation member 44A stops being rotated and is held with a predetermined axial force applied to the connection shaft portion formation member 44A for a predetermined time.

Figure 12:
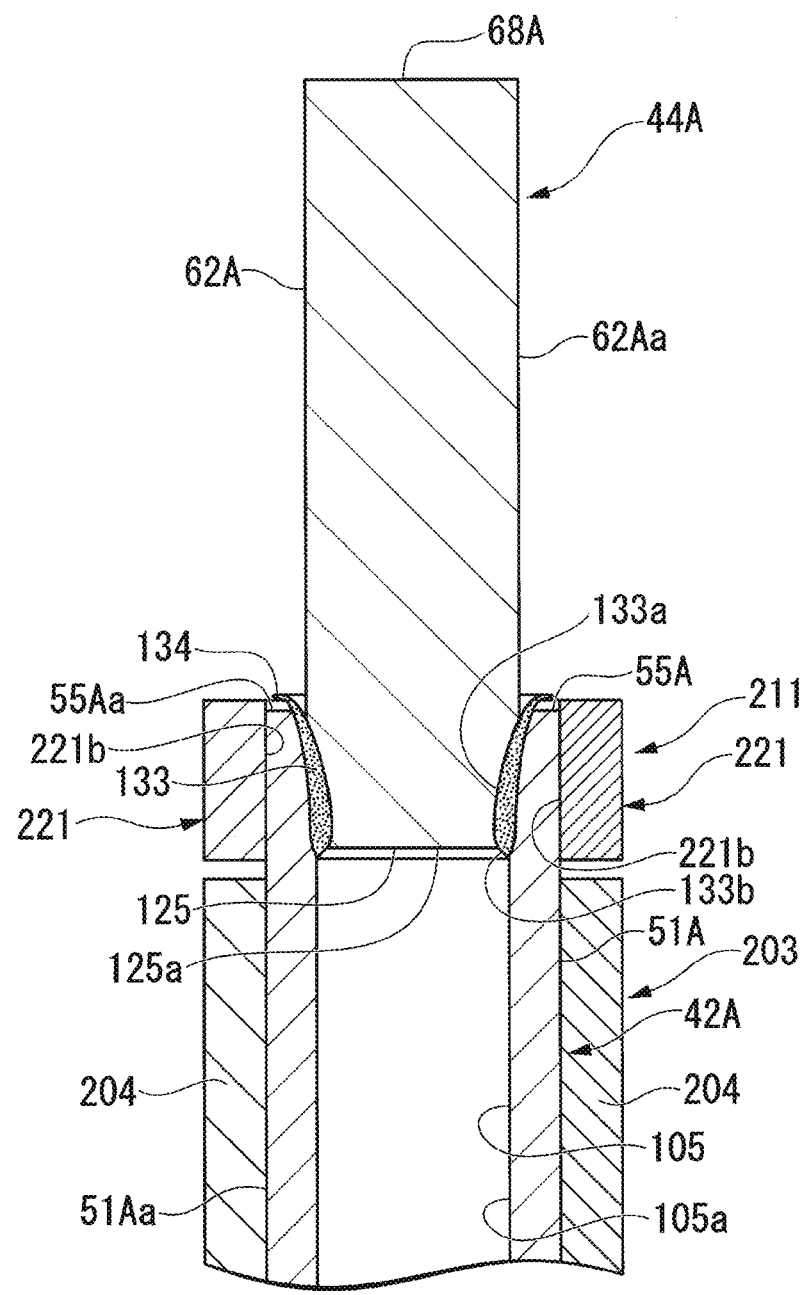
FIG. 12 is a cross-sectional view illustrating a state after the connection shaft portion joining step in the method for manufacturing the rod according to the one embodiment of the present invention.

Then, after the material is softened due to the frictional heat and is stirred, the inner peripheral portion of the opposite-end conical hole-shaped portion 103 of the main shaft portion formation member 42A and the outer peripheral portion of the conical outer peripheral portion 121 of the connection shaft portion formation member 44A are solidified and integrated, thereby being formed into a welded portion 133 as illustrated in FIG. 12. The welded portion 133 is formed between the inner peripheral portion of the main shaft portion formation member 42A and the outer peripheral portion of the connection shaft portion formation member 44A. The welded portion 133 is shaped approximately in conformity with the shapes of the opposite-end conical hole-shaped portion 103 and the conical outer peripheral portion 121 illustrated in FIG. 11, and has a tubular shape flaring toward the opposite-end portion 55A side of the main shaft portion formation member 42A. The welded portion 133 includes a burr 134 protruding axially outward from the end surface 55Aa of the opposite-end portion 55A of the main shaft portion formation member 42A and protruding radially outward from the outer peripheral surface 62Aa of the columnar outer peripheral portion 62A of the connection shaft portion formation member 44A.

Now, the welded portion 133 includes a welded main body portion 133a, a welded margin portion 133b, and the burr 134. The welded main body portion 133a is joined with both the main shaft portion formation member 42A and the connection shaft portion formation member 44A while axially positionally overlapping both of them. The welded margin portion 133b is located on the intermediate hole-shaped portion 105 side with respect to the welded main body portion 133a in the axial direction and axially positionally overlaps only the main shaft portion formation member 42A out of the main shaft portion formation member 42A and the connection shaft portion formation member 44A.

The welded main body portion 133a serves as a portion radially joining the main shaft portion formation member 42A and the connection shaft portion formation member 44A by the connection shaft portion joining step S14, which joins the main shaft portion formation member 42A and the connection shaft portion formation member 44A by the welding connection. The welded main body portion 133a is a portion of the welded portion 133 between the end surface 55Aa of the opposite-end portion 55A of the main shaft portion formation member 42A and the end surface 125a of the end portion 125 of the connection shaft portion formation member 44A. The axial range of the welded main body portion 133a includes a portion where the main shaft portion formation member 42A, the connection shaft portion formation member 44A, and the welded main body portion 133a exist without any space over the entire surface in cross section perpendicular to the central axis of the main shaft portion formation member 42A.

The welded margin portion 133b is a range where the main shaft portion formation member 42A and the connection shaft portion formation member 44A are not radially joined with each other by the connection shaft portion joining step S14. In other words, the welded margin portion 133b is an axial range where the connection shaft portion formation member 44A does not exist although the welded portion 133 and the main shaft portion formation member 42A exist. The welded margin portion 133b is a portion of the welded portion 133 located on the opposite side from the end surface 55Aa with respect to the end surface 125a of the end portion 125 of the connection shaft portion formation member 43A.

Now, in the above-described main shaft portion formation member second restraining step S11, the axial range restrained by the restraining member 211 where the pair of divided pieces 221 places their respective restraining surfaces 221b in planar contact with the outer peripheral surface 51Aa of the main shaft portion formation member 42A is set so as to include at least the entire axial range of this welded main body portion 133a. In other words, the axial range restrained by the restraining member 211 is set so as to include at least the entire range from the end surface 55Aa of the opposite-end portion 55A of the main shaft portion formation member 42A to the position of the end surface 125a of the end portion 125 of the connection shaft portion formation member 44A after the connection shaft portion joining step S14. Due to this setting, the restraining member 211 prevents the range of the main shaft portion formation member 42A that axially positionally overlaps at least the welded main body portion 133a from being deformed radially outward by being softened due to the frictional heat in the connection shaft portion joining step S14, by physically restraining this portion.

The manufacturing method according to the present embodiment includes a connection shaft portion formation member holding release step S15 of releasing the holding of the connection shaft portion formation member 44A by the rotation-side chuck 232 of the friction pressure welding machine 201, which is performed after this connection shaft portion joining step S14. Further, the manufacturing method according to the present embodiment includes a main shaft portion formation member second restraining release step S16 of releasing the restraint of the main shaft portion formation member 42A by the restraining member 211 of the friction pressure welding machine 201, which is performed after this connection shaft portion formation member holding release step S15. Further, the manufacturing method according to the present embodiment includes a main shaft portion formation member second holding release step S17 of releasing the holding of the attachment shaft portion formation member 43A by the fixation-side chuck 203 of the friction pressure welding machine 201, which is performed after the main shaft portion formation member second restraining release step S16. The order of the connection shaft portion formation member holding release step S15, the main shaft portion formation member second restraining release step S16, and the main shaft portion formation member second holding release step S17 is not limited thereto, and these steps may be performed in any order or may be performed in parallel concurrently.

In the manufacturing method according to the present embodiment, a machining processing step S18 is performed after the main shaft portion formation member second holding release step S17. The machining processing step S18 includes a one-side distal end portion formation step, which forms the distal end portion 59 of the attachment shaft portion 43 illustrated in FIG. 13 by performing machining processing of the end portion 59A of the attachment shaft portion formation member 43A illustrated in FIG. 9. Further, the machining processing step S18 includes a main shaft portion one-end portion formation step, which forms the one-end portion 53 of the main shaft portion 42 illustrated in FIG. 13 by performing machining processing of the one-end portion 53A of the main shaft portion formation member 42A illustrated in FIG. 9. Further, the machining processing step S18 includes a male screw formation step, which forms the male screw 57 of the attachment shaft portion 43 illustrated in FIG. 13 by performing machining processing of the columnar outer peripheral portion 57A of the attachment shaft portion formation member 43A illustrated in FIG. 9.

Figure 13:
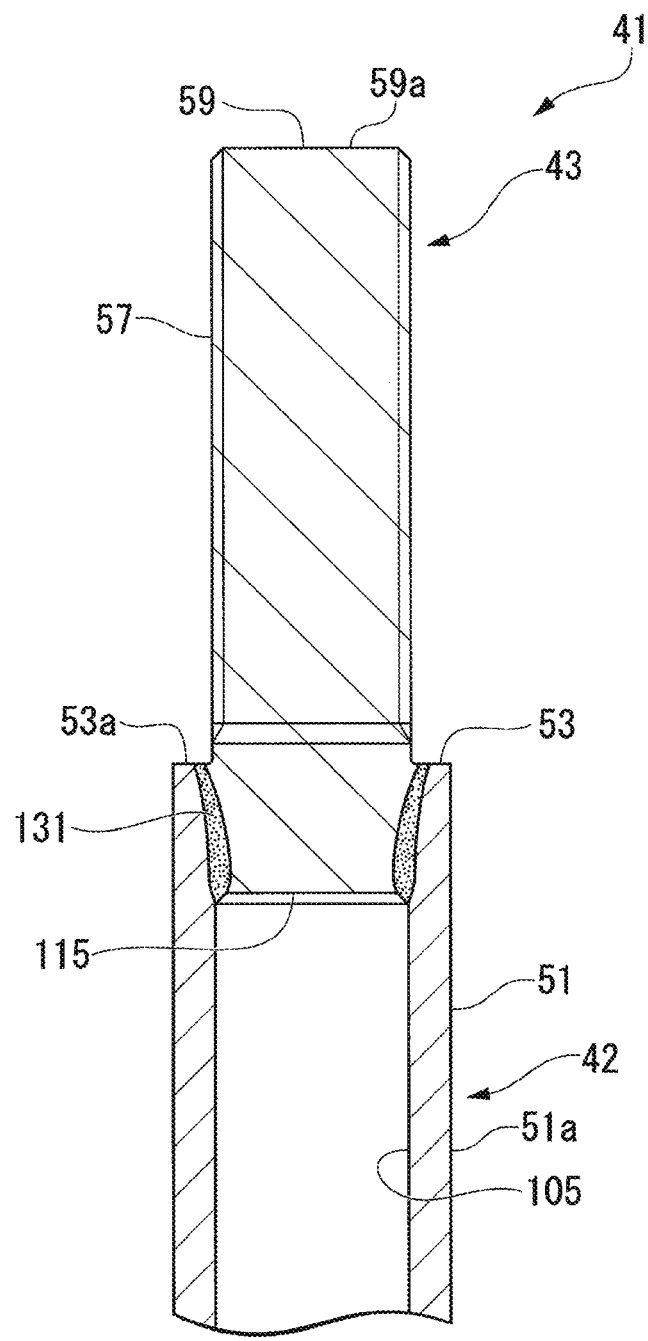
FIG. 13 is a cross-sectional view of one end side illustrating the rod manufactured by the method for manufacturing the rod according to the one embodiment of the present invention.

Then, even if the burr 132 is generated because melted metal protrudes outward and is solidified between the one-end portion 53A of the main shaft portion formation member 42A and the columnar outer peripheral portion 57A of the attachment shaft portion formation member 43A as illustrated in FIG. 9 in the attachment shaft portion joining step S6, this burr 132 can be cut out and removed as illustrated in FIG. 13 by the above-described main shaft portion one-end portion formation step and male screw formation step in the machining processing step S18. In other words, the manufacturing method according to the present embodiment includes the male screw formation step of applying threading processing on a portion of the attachment shaft portion formation member 43A other than the welded portion 131 joined with the main shaft portion formation member 42A and also removing the burr 132 of the welded portion 131 at this time. The male screw formation step may be performed by forming a foundation portion of the male screw 57 by cutting processing and forming the male screw 57 by thread rolling. In this case, the burr 132 is supposed to be removed at the time of the cutting processing of the foundation portion of the male screw 57.

Figure 14:
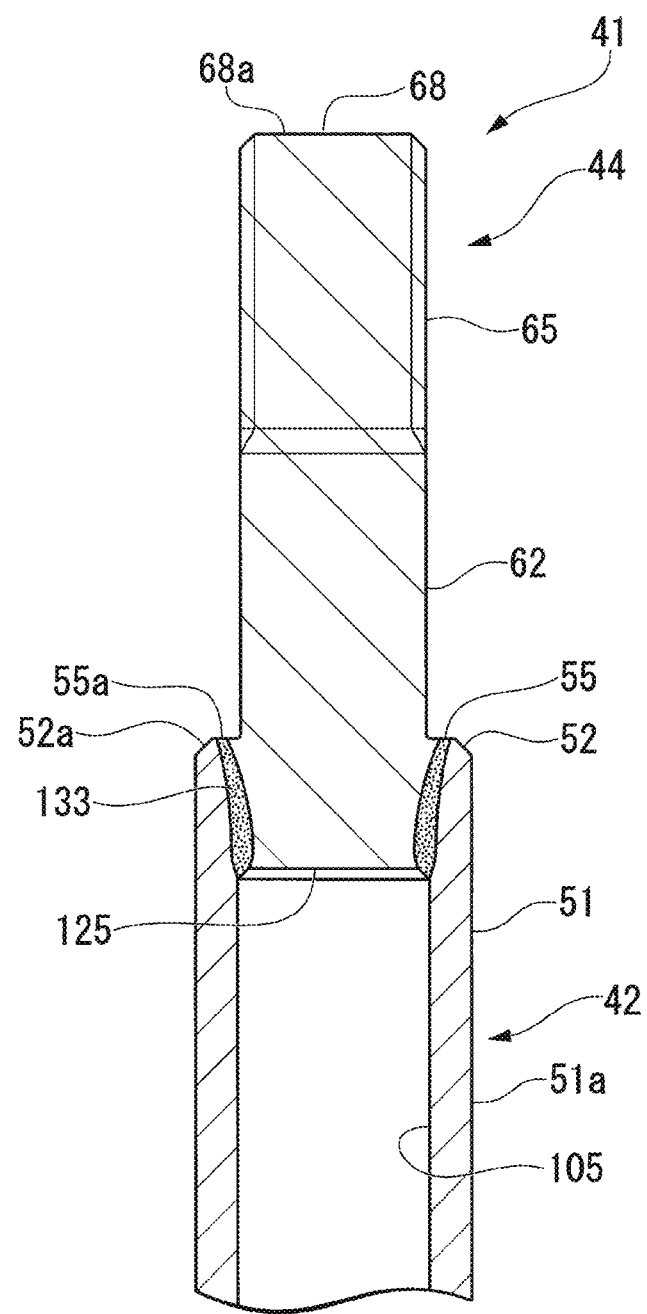
FIG. 14 is a cross-sectional view of the opposite end side illustrating the rod manufactured by the method for manufacturing the rod according to the one embodiment of the present invention.

Further, the machining processing step S18 includes an opposite-side distal end portion formation step, which forms the distal end portion 68 of the attachment shaft portion 43 illustrated in FIG. 14 by performing machining processing of the end portion 68A of the connection shaft portion formation member 44A illustrated in FIG. 12. Further, the machining processing step S18 includes a main shaft portion opposite-end portion formation step, which forms the taper portion 52 and the opposite-end portion 55 of the main shaft portion 42 illustrated in FIG. 14 by performing machining processing of the opposite-end portion 55A of the main shaft portion formation member 42A illustrated in FIG. 12. Further, the machining processing step S18 includes a male screw and the like formation step, which forms the fitting outer peripheral portion 62 and the male screw 65 of the connection shaft portion 44 illustrated in FIG. 14 by performing machining processing of the columnar outer peripheral portion 62A of the connection shaft portion formation member 44A illustrated in FIG. 12.

Then, even if the burr 134 is generated because melted metal protrudes outward and is solidified between the opposite-end portion 55A of the main shaft portion formation member 42A and the columnar outer peripheral portion 62A of the connection shaft portion formation member 44A as illustrated in FIG. 12 in the connection shaft portion joining step S14, this burr 134 can be cut out and removed as illustrated in FIG. 14 by the above-described main shaft portion opposite-end portion formation step and male screw and the like formation step in the machining processing step S18. In other words, the manufacturing method according to the present embodiment includes the male screw and the like formation step of applying threading processing on a portion of the connection shaft portion formation member 44A other than the welded portion 133 joined with the main shaft portion formation member 42A and also removing the burr 134 of the welded portion 133 at this time. The male screw and the like formation step may be performed by forming the fitting outer peripheral portion 62 and a foundation portion of the male screw 65 by cutting processing and forming the male screw 65 by thread rolling. In this case, the burr 134 is supposed to be removed at the time of the cutting processing of the fitting outer peripheral portion 62 and the foundation portion of the male screw 65.

The machining processing step S18 is followed by a step of welding further another component, a step of forming the outer peripheral surface 51a of the main outer peripheral portion 51 by performing centerless grinding on the main outer peripheral portion 51A, a high-frequency quenching step, and the like.

The rod 41 manufacturing by the above-described manufacturing method according to the present embodiment includes the main shaft portion 42, which slidably contacts the rod guide 31 and the seal member 33, and the attachment shaft portion 43 and the connection shaft portion 44, both of which do not slidably contact the rod guide 31 and the seal member 33, as illustrated in FIG. 1. The main shaft portion 42 is solid at the portion where the attachment shaft portion formation member 43A and the connection shaft portion formation member 44A are inserted, and is hollow at portions other than that. Both the attachment shaft portion 43 and the connection shaft portion 44 are solid. Throughout the entire length of the rod 41, the outer diameter dimensions of both of the attachment shaft portion 43 and the connection shaft portion 44 are smaller than the outer diameter dimension of the main outer peripheral portion 51 of the main shaft portion 42.

The above-described patent literature, PTL 1 discusses a manufacturing method that manufactures a rod by performing friction pressure welding on a cylindrical member and a mixed member having a cylindrical portion and a columnar portion. This manufacturing method is configured to join the cylindrical member and the mixed member by bringing an end surface of the cylindrical member and an end surface of the cylindrical portion of the mixed member into contact with each other and applying a pressure thereto while fixing the cylindrical member and rotating the mixed member. Then, this manufacturing method is configured to remove a burr generated at the joint portion at the time of the joining by cutting processing. On the other hand, in a case where the rod slidably contacts a sliding contact member at such a joint portion, the burr should be carefully removed before machining processing step for finishing the rod into a final shape. For example, a step added for the sole purpose of cutting and removing the burr and a waste grinding step of grinding the entire outer peripheral portion including the portion after the burr is cut and removed should be performed before the machining processing step for finishing the rod into the final shape.

On the other hand, the method for manufacturing the rod 41 according to the present embodiment includes the preparation step S1 of preparing the hollow main shaft portion formation member 42A, which becomes the portion of the rod 41 that slidably contacts the rod guide 31 and the seal member 33, and the attachment shaft portion formation member 43A and the connection shaft portion formation member 44A, which become the portions of the rod 41 that do not slidably contact the rod guide 31 and the seal member 33 and are formed so as to include the portions smaller in outer diameter dimension than the outer diameter dimension of the main shaft portion formation member 42A. Further, the method according to the present embodiment includes the attachment shaft portion formation member approach step S5, which moves the inner peripheral surface 101a of the main shaft portion formation member 42A and the outer peripheral surface 111a of the attachment shaft portion formation member 43A closer to each other while rotating the attachment shaft portion formation member 43A, and the attachment shaft portion joining step S6, which joins the main shaft portion formation member 42A and the attachment shaft portion formation member 43A to each other by the welding connection with the aid of friction by axially pressing in the main shaft portion formation member 42A and the attachment shaft portion formation member 43A by the predetermined amount after placing the inner peripheral surface 101a of the main shaft portion formation member 42A and the outer peripheral surface 111a of the attachment shaft portion formation member 43A into contact with each other. Further, the method according to the present embodiment includes the connection shaft portion formation member approach step S13, which moves the inner peripheral surface 103a of the main shaft portion formation member 42A and the outer peripheral surface 121a of the connection shaft portion formation member 44A closer to each other while rotating the connection shaft portion formation member 44A, and the connection shaft portion joining step S14, which joins the main shaft portion formation member 42A and the connection shaft portion formation member 44A to each other by the welding connection with the aid of friction by axially pressing in the main shaft portion formation member 42A and the connection shaft portion formation member 44A by the predetermined amount after placing the inner peripheral surface 103a of the main shaft portion formation member 42A and the outer peripheral surface 121a of the connection shaft portion formation member 44A into contact with each other. Due to these steps, the present embodiment can allow the above-described rod 41 to be easily manufactured, thereby facilitating the manufacturing of the rod 41.

Further, the method for manufacturing the rod 41 according to the present embodiment includes the main shaft portion formation member first restraining step S3 of placing the restraining member 211 into abutment with the outer peripheral surface 51Aa of the main shaft portion formation member 42A on the one-end portion 53A side before the attachment shaft portion joining step S6. As a result, the restraining member 211 prevents the portion of the main shaft portion formation member 42A on the one-end portion 53A side from being deformed radially outward by being softened due to the frictional heat in the attachment shaft portion joining step S6, by restraining this portion. In addition, this method leads to a removal of heat from the outer peripheral portion of the main shaft portion formation member 42A on the one-end portion 53A side due to the abutment of the restraining member 211, thereby contributing to further preventing the portion of the main shaft portion formation member 42A on the one-end portion 53A side from being deformed radially outward due to the frictional heat at the time of the attachment shaft portion joining step S6. Therefore, the portion of the main shaft portion formation member 42A on the one-end portion 53A side can be excellently joined with the attachment shaft portion formation member 43A. Therefore, the portion of the main shaft portion formation member 42A on the one-end portion 53A side and the attachment shaft portion formation member 43A can be joined at enhanced strength. Therefore, the manufacturing quality can be improved.

More specifically, if the attachment shaft portion joining step S6 is performed without the main shaft portion formation member first restraining step S3 performed, the portion of the main shaft portion formation member 42A on the one-end portion 53A side is softened due to the frictional heat and is tilted toward the outer peripheral side, thereby being unintentionally expanded in diameter. Such a portion expanded in diameter is removed by being ground in the step after that, and therefore does not remain in the final product. However, the main shaft portion formation member 42A is undesirably joined at reduced strength with the attachment shaft portion formation member 43A by the welding connection due to the tilt of the portion of the main shaft portion formation member 42A on the one-end portion 53A side toward the outer peripheral side. In other words, the portion of the main shaft portion formation member 42A on the one-end portion 53A side fails to be excellently joined with the attachment shaft portion formation member 43A. On the other hand, the method for manufacturing the rod 41 according to the present embodiment performs the attachment shaft portion joining step S6 after performing the main shaft portion formation member first restraining step S3, thereby being able to prevent the portion of the main shaft portion formation member 42A on the one-end portion 53A side from tilting toward the outer peripheral side, and thus being able to excellently join the portion of the main shaft portion formation member 42A on the one-end portion 53A side with the attachment shaft portion formation member 43A.

Further, even with a reduction in the precision of the tolerances of the main shaft portion formation member 42A and the attachment shaft portion formation member 43A, the portion of the main shaft portion formation member 42A on the one-end portion 53A side can be excellently joined with the attachment shaft portion formation member 43A.

Figure 15:
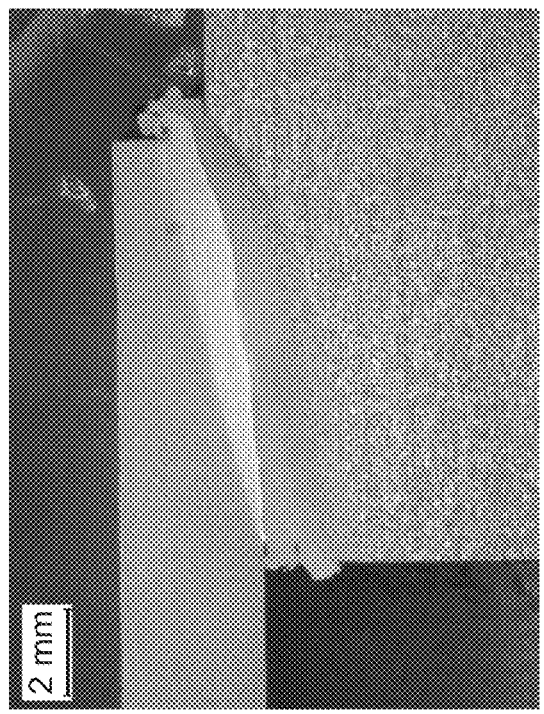
FIG. 15 is a photograph of a cross section near a welded portion of the rod manufactured by the method for manufacturing the rod according to the one embodiment of the present invention.
Figure 16:
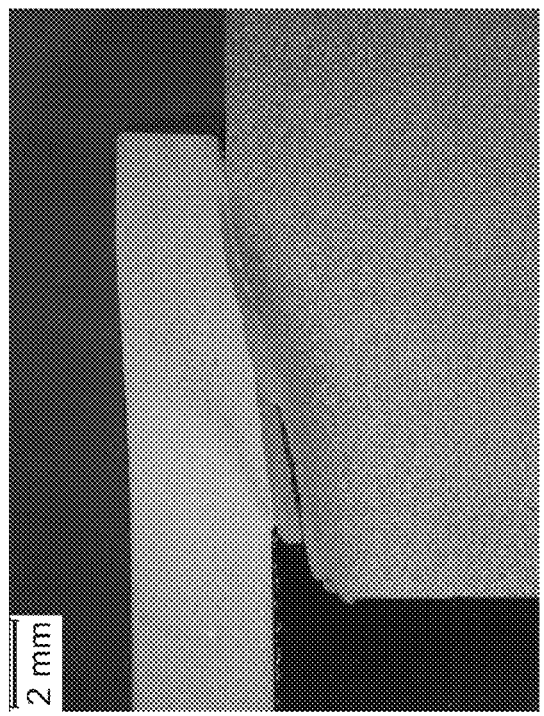
FIG. 16 is a photograph of a cross section near a welded portion of another rod.

Then, FIG. 15 is a photograph indicating a cross section near the welded portion 131 when the rod 41 is manufactured with the main shaft portion formation member first restraining step S3 included. FIG. 16 is a photograph indicating a cross section near the welded portion 131 when the rod 41 is manufactured without the main shaft portion formation member first restraining step S3 included. As clearly seen from these photographs in FIGS. 15 and 16, it can be understood that the welded portion 131 when the rod 41 is manufactured with the main shaft portion formation member first restraining step S3 included can excellently join the portion of the main shaft portion formation member 42A on the one-end portion 53A side with the attachment shaft portion formation member 43A than the welded portion 131 when the rod 41 is manufactured without the main shaft portion formation member first restraining step S3 included. More specifically, the welded portion 131 when the rod 41 is manufactured without the main shaft portion formation member first restraining step S3 included leads to generation of a space, thereby undesirably resulting in a reduction in the joint range due to the welding. Compared therewith, the embodiment can form the welded portion 131 with a smaller space by performing the main shaft portion formation member first restraining step S3, thereby preventing the reduction in the joint range due to the welding and leading to enhanced joint strength.

In addition, the range restrained by the restraining member 211 in the main shaft portion formation member first restraining step S3 is at least the range joined in the attachment shaft portion joining step S6, which joins the main shaft portion formation member 42A and the attachment shaft portion formation member 43A by the welding connection, and therefore the portion of the main shaft portion formation member 42A on the one-end portion 53A side and the attachment shaft portion formation member 43A can be joined at effectively enhanced strength.

Figure 17:
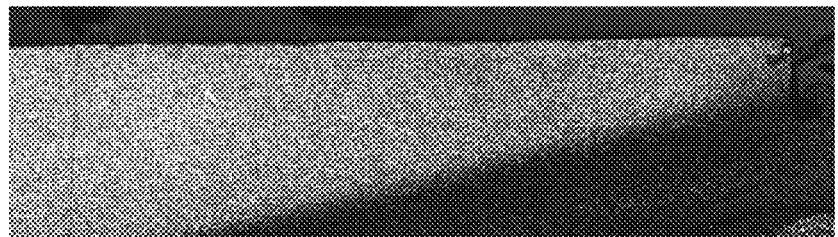
FIG. 17 is a photograph of a cross section of one end portion of a main shaft portion formation member of the rod manufactured by the method for manufacturing the rod according to the one embodiment of the present invention.
Figure 18:
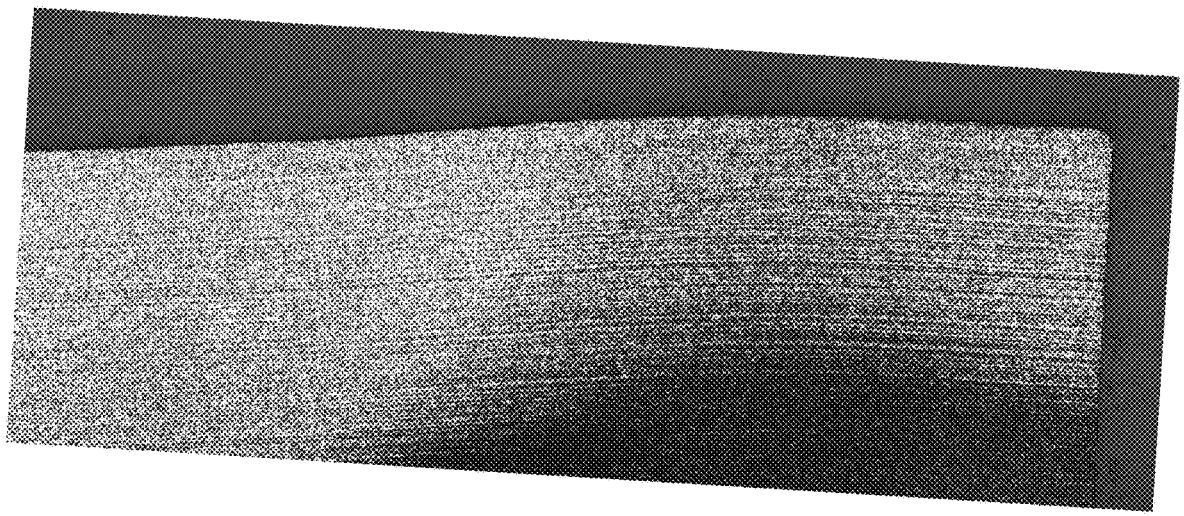
FIG. 18 is a photograph of a cross section of one end portion of a main shaft portion formation member of another rod.

Further, FIG. 17 is a photograph indicating a cross-sectional texture near the one-end portion 53A of the main shaft portion formation member 42A when the rod 41 is manufactured with the main shaft portion formation member first restraining step S3 included, and FIG. 18 is a photograph indicating a cross-sectional texture near the one-end portion 53A of the main shaft portion formation member 42A when the rod 41 is manufactured without the main shaft portion formation member first restraining step S3 included. As clearly seen therefrom, no deformation is confirmed near the one-end portion 53A of the main shaft portion formation member 42A in the flow of the texture when the main shaft portion formation member 42A is pulled out in the photograph when the rod 41 is manufactured with the main shaft portion formation member first restraining step S3 included, but deformation is confirmed near the one-end portion 53A of the main shaft portion formation member 42A in the flow of the texture when the main shaft portion formation member 42A is pulled out in the photograph when the rod 41 is manufactured without the main shaft portion formation member first restraining step S3 included. The difference between them makes it possible to distinguish whether the main shaft portion formation member first restraining step S3 is included or the main shaft portion formation member first restraining step S3 is not included when the rod 41 is manufactured based on the cross-sectional texture of the rod 41 after the rod 41 is manufactured.

Further, the method for manufacturing the rod 41 according to the embodiment is also similar for the joining of the connection shaft portion formation member 44A with the main shaft portion formation member 42A near the opposite-end portion 55A. More specifically, the method for manufacturing the rod 41 according to the embodiment includes the main shaft portion formation member second restraining step S11, which places the restraining member 211 into abutment with the outer peripheral surface 51Aa of the main shaft portion formation member 42A on the opposite-end portion 55A side before the connection shaft portion joining step S14. As a result, the restraining member 211 prevents the portion of the main shaft portion formation member 42A on the opposite-end portion 55A side from being deformed radially outward by being softened due to the frictional heat in the connection shaft portion joining step S14, by restraining this portion. In addition, this method leads to a removal of heat from the outer peripheral portion of the main shaft portion formation member 42A on the opposite-end portion 55A side due to the abutment of the restraining member 211, thereby contributing to further preventing the portion of the main shaft portion formation member 42A on the opposite-end portion 55A side from being deformed radially outward due to the frictional heat at the time of the connection shaft portion joining step S14. Therefore, the portion of the main shaft portion formation member 42A on the opposite-end portion 55A side can be excellently joined with the connection shaft portion formation member 44A. Therefore, the portion of the main shaft portion formation member 42A on the opposite-end portion 55A side and the connection shaft portion formation member 44A can be joined at enhanced strength.

In addition, the range restrained by the restraining member 211 in the main shaft portion formation member second restraining step S11 is at least the range joined in the connection shaft portion joining step S14, which joins the main shaft portion formation member 42A and the connection shaft portion formation member 44A by the welding connection, and therefore the portion of the main shaft portion formation member 42A on the opposite-end portion 55A side and the connection shaft portion formation member 44A can be joined at effectively enhanced strength.

In addition, the addition of the main shaft portion formation member first restraining step S3 causes the restraining member 211 to prevent the portion of the main shaft portion formation member 42A on the one-end portion 53A side from bulging radially outward at the time of the attachment shaft portion joining step S6, and the addition of the main shaft portion formation member second restraining step S11 causes the restraining member 211 to prevent the portion of the main shaft portion formation member 42A on the opposite-end portion 55A side from bulging radially outward at the time of the connection shaft portion joining step S14. Therefore, the main shaft portion formation member 42A in a state that both the attachment shaft portion joining step S6 and the connection shaft portion joining step S14 are ended is prevented from bulging radially outward, thereby being able to prevent this bulge from getting in the way to create a problem with conveyance to the subsequent steps. Therefore, the present embodiment allows the manufacturing method to improve the productivity. Now, the subsequent steps refer to steps such as the step of welding further another component, the centerless grinding step of forming the outer peripheral surface 51a of the main outer peripheral portion 51, and the high-frequency quenching step.

Further, the method for manufacturing the rod 41 according to the present embodiment includes the male screw forming step, which performs the threading processing on the portion of the attachment shaft portion formation member 43A other than the welded portion 131 joined with the main shaft portion formation member 42A and also removes the burr 132 of the welded portion 131, and therefore can remove the burr 132 by the cutting processing along with the threading processing of the attachment shaft portion formation member 43A. Therefore, the burr 132 can be removed without requiring a step added for the sole purpose of it. Similarly, the method for manufacturing the rod 41 according to the present embodiment includes the male screw and the like forming step, which performs the threading processing on the portion of the connection shaft portion formation member 44A other than the welded portion 133 joined with the main shaft portion formation member 42A and also removes the burr 134 of the welded portion 133, and therefore can remove the burr 134 by the cutting processing along with the threading processing of the connection shaft portion formation member 44A. Therefore, the burr 134 can be removed without requiring a step added for the sole purpose of it. Therefore, the present embodiment can reduce the facility cost and the man-hours.

Further, the one-end conical hole-shaped portion 101 and the opposite-end conical hole-shaped portion 103 are formed at the end portions of the inner peripheral portion of the main shaft portion formation member 42A, and this allows the inner peripheral portion of the main shaft portion formation member 42A and the outer peripheral portions of the attachment shaft portion formation member 43A and the connection shaft portion formation member 44A to be excellently joined with each other by the welding connection with the aid of friction.

Further, the one-end conical hole-shaped portion 101 and the opposite-end conical hole-shaped portion 103 are formed at the end portions of the inner peripheral portion of the main shaft portion formation member 42A, the conical outer peripheral portion 111 is formed at the end portion of the attachment shaft portion formation member 43A on the joint side, and the conical outer peripheral portion 121 is also formed at the end portion of the connection shaft portion formation member 44A on the joint side. Therefore, the inner peripheral portion of the main shaft portion formation member 42A and the outer peripheral portions of the attachment shaft portion formation member 43A and the connection shaft portion formation member 44A can be further excellently joined with each other by the welding connection with the aid of friction. Now, when the inner peripheral portion of the main shaft portion formation member 42A and the outer peripheral portion of the attachment shaft portion formation member 43A and the outer peripheral portion of the connection shaft portion formation member 44A are joined with each other by the welding connection with the aid of friction in this manner, this results in the welded portions 131 and 133 having a tubular shape flaring toward the end portion side of the main shaft portion 42.

Then, the angles of the one-end conical hole-shaped portion 101 and the opposite-end conical hole-shaped portion 103 with respect to the axis of the main shaft portion formation member 42A are set to 3° or larger and 12° or smaller. Therefore, the inner peripheral portion of the main shaft portion formation member 42A and the outer peripheral portion of the attachment shaft portion formation member 43A can be further excellently joined with each other by the welding connection with the aid of friction. Further, the inner peripheral portion of the main shaft portion formation member 42A and the outer peripheral portion of the connection shaft portion formation member 44A can be further excellently joined with each other by the welding connection with the aid of friction. More specifically, if the angles of the one-end conical hole-shaped portion 101 and the opposite-end conical hole-shaped portion 103 with respect to the axis of the main shaft portion formation member 42A are smaller than 3°, this makes it impossible to establish a stable contact between the main shaft portion formation member 42A and the attachment shaft portion formation member 43A and the connection shaft portion formation member 44A, thereby achieving the joint only over approximately 2 to 5 mm even under various conditions and undesirably causing only the burr to grow even with an increase in the pressing amount or the like. On the other hand, if the angles of the one-end conical hole-shaped portion 101 and the opposite-end conical hole-shaped portion 103 with respect to the axis of the main shaft portion formation member 42A are larger than 12°, this leads to an increase in the joint area, thereby undesirably resulting in an increase in the torque of the friction pressure welding machine, which rotates the attachment shaft portion formation member 43A and the connection shaft portion formation member 44A relative to the main shaft portion formation member 42A. Further, if these angles are larger than 12°, this undesirably facilitates a slip of the work or leads to an excessive load imposed on the motor of the friction pressure welding machine. Further, if these angles are larger than 12°, this leads to a reduction in the thickness of the main shaft portion formation member 42A on the end portion sides, thereby raising a possibility of deformation of the main shaft portion 42. These problems can be avoided by setting the angles to 3° or larger and 12° or smaller.

Figure 19:
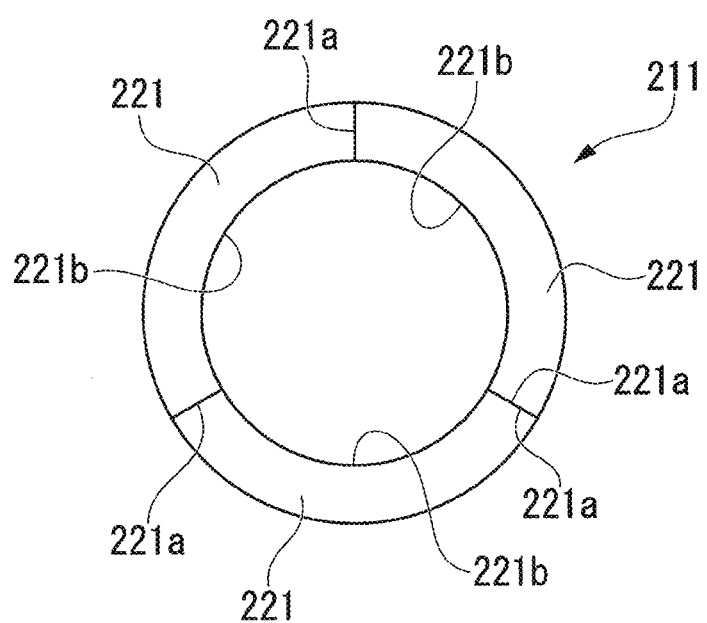
FIG. 19 is a front view illustrating a modification example of the restraining member used in the method for manufacturing the rod according to the one embodiment of the present invention.

The restraining member 211 is formed by the two divided pieces 221 into which the cylinder is bisected in the present embodiment, but may be formed by three divided pieces 221 into which the cylinder is trisected like a restraining member 211 illustrated in FIG. 19 or may be formed by divided pieces 221 into which the cylinder is quartered or divided into more pieces.

Figure 20:
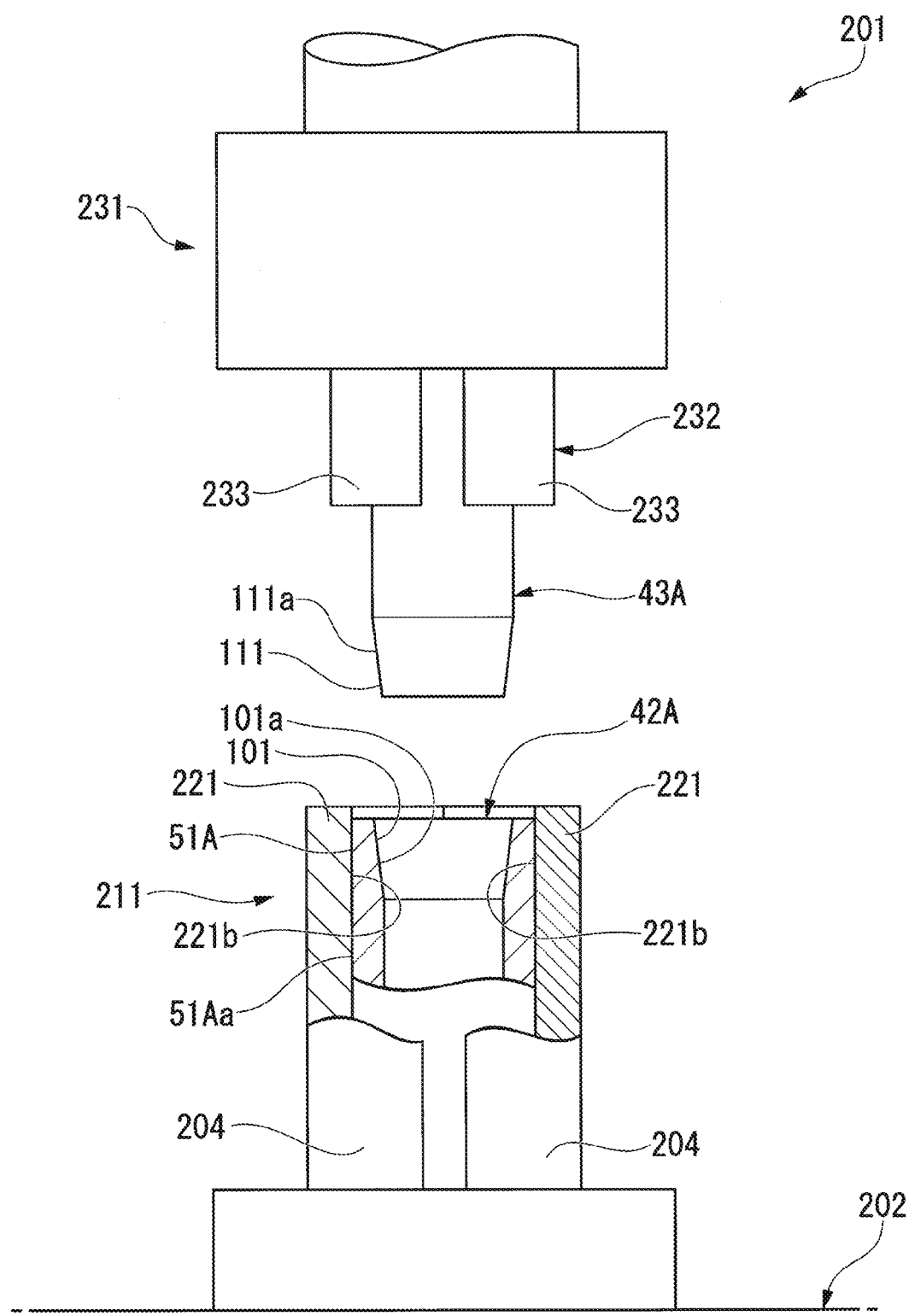
FIG. 20 is a front view illustrating a modification example of the main portions of the friction pressure welding machine used in the method for manufacturing the rod according to the one embodiment of the present invention with a part therefore indicated in cross section.

Further, the divided pieces 221 of the restraining member 211 may be integrated with the claw portions 204, as illustrated in FIG. 20. In other words, the restraining member 211 may be configured to also serve as the chuck that relatively non-rotatably holds the main shaft portion formation member 42A.

In this case, the radius of the restraining surface 221b of the divided piece 221 is supposed to be set to a diameter equivalent to or slightly larger than the radius of the outer peripheral surface 51Aa of the main shaft portion formation member 42A when the main shaft portion formation member 42A is held by the claw portions 204. Therefore, when the main shaft portion formation member 42A is held by the claw portions 204, the restraining member 211 abuts against the main outer peripheral portion 51A in the predetermined range of the main shaft portion formation member 42A similarly to the above-described example. In this case, the main shaft portion formation member first holding step S2 and the main shaft portion formation member first restraining step S3 become the same step, the main shaft portion formation member first restraining release step S8 and the main shaft portion formation member first holding release step S9 become the same step, the main shaft portion formation member second holding step S10 and the main shaft portion formation member second restraining step 11 become the same step, and the main shaft portion formation member second restraining release step S16 and the main shaft portion formation member second holding release step S17 become the same step. Therefore, the manufacturing efficiency can be improved.

In the above-described embodiment, the manufacturing method is configured in such a manner that the connection shaft portion formation member approach step S13 is performed after the attachment shaft portion joining step S6. On the other hand, the manufacturing method may be configured in such a manner that the connection shaft portion formation member approach step S13 and the connection shaft portion joining step S14 are performed before the attachment shaft portion formation member approach step S5 and the attachment shaft portion joining step S6. Further, the manufacturing method may be configured in such a manner that the attachment shaft portion formation member approach step S5 and the attachment shaft portion joining step S6, and the connection shaft portion formation member approach step S13 and the connection shaft portion joining step S14 are performed in parallel with each other.

Further, the present embodiment has been described citing the example when the main shaft portion formation member 42A is fixed and the attachment shaft portion formation member 43A is rotated in the attachment shaft portion formation member approach step S5 and the attachment shaft portion joining step S6 in the embodiment. On the other hand, the attachment shaft portion formation member 43A may be fixed and the main shaft portion formation member 42A may be rotated, or both the main shaft portion formation member 42A and the attachment shaft portion formation member 43A may be rotated. In other words, the attachment shaft portion formation member approach step S5 and the attachment shaft portion joining step S6 can be performed appropriately by moving the inner peripheral surface 101a of the one-end conical hole-shaped portion 101 of the main shaft portion formation member 42A and the outer peripheral surface 111a of the conical outer peripheral portion 111 of the attachment shaft portion formation member 43A closer to each other to place them into pressure contact with each other while rotating at least any one of the main shaft portion formation member 42A or the attachment shaft portion formation member 43A.

Similarly, the present embodiment has been described citing the example when the main shaft portion formation member 42A is fixed and the connection shaft portion formation member 44A is rotated in the connection shaft portion formation member approach step S13 and the connection shaft portion joining step S14. On the other hand, the connection shaft portion formation member 44A may be fixed and the main shaft portion formation member 42A may be rotated, or both the main shaft portion formation member 42A and the connection shaft portion formation member 44A may be rotated. In other words, the connection shaft portion formation member approach step S13 and the connection shaft portion joining step S14 can be performed appropriately by moving the inner peripheral surface 103a of the opposite-end conical hole-shaped portion 103 of the main shaft portion formation member 42A and the outer peripheral surface 121a of the conical outer peripheral portion 121 of the connection shaft portion formation member 44A closer to each other to place them into pressure contact with each other while rotating at least any one of the main shaft portion formation member 42A or the connection shaft portion formation member 44A.

Further, the embodiment has been described citing the example when the one-end conical hole-shaped portion 101 and the opposite-end conical hole-shaped portion 103 are formed at the end portions of the inner peripheral portion of the main shaft portion formation member 42A, and the conical outer peripheral portion 111 is formed at the end portion of the attachment shaft portion formation member 43A on the joint side with the main shaft portion formation member 42A and the conical outer peripheral portion 121 is also formed at the end portion of the connection shaft portion formation member 44A on the joint side with the main shaft portion formation member 42A. On the other hand, the end portion of the attachment shaft portion formation member 43A on the joint side may be columnar, and the end portion of the connection shaft portion formation member 44A on the joint side may be columnar. In other words, the above-described effects can be still achieved as long as the one-end conical hole-shaped portion 101 and the opposite-end conical hole-shaped portion 103 are formed at least on the end portions of the inner peripheral portion of the main shaft portion formation member 42A.

Further, the embodiment has been described citing the example when the male screw formation step of forming the male screw 57 of the attachment shaft portion 43 and the male screw and the like formation step of forming the fitting outer peripheral portion 62 and the male screw 65 of the connection shaft portion 44 are performed in the machining processing step S18 performed after the attachment shaft portion joining step S6 and the connection shaft portion joining step S14. On the other hand, the male screw 57 of the attachment shaft portion 43 may be formed on the attachment shaft portion formation member 43A in advance, and the fitting outer peripheral portion 62 and the male screw 65 of the connection shaft portion 44 may be formed on the connection shaft portion formation member 44A in advance. Then, the manufacturing method may be configured in such a manner that, after that, the attachment shaft portion formation member approach step S5 and the attachment shaft portion joining step S6 are performed, and the connection shaft portion formation member approach step S13 and the connection shaft portion joining step S14 are performed. In other words, a step of performing threading processing on the attachment shaft portion 43 of the attachment shaft portion formation member 43A in advance may be included before the step of joining the main shaft portion formation member 42A and the attachment shaft portion formation member 43A. Further, a step of performing threading processing on the connection shaft portion 44 of the connection shaft portion formation member 44A in advance may be included before the step of joining the main shaft portion formation member 42A and the connection shaft portion formation member 44A. Even when the burrs 132 and 134 are generated in the welding connection with the aid of friction, they can be generated at positions not reaching the main outer peripheral portion 51 of the main shaft portion 42, which slidably contacts the rod guide 31 and the seal member 33, as described above, and this allows the machining processing step S18, which is the step subsequent to the attachment shaft portion joining step S6 and the connection shaft portion joining step S14, to be even omitted by performing threading processing in advance.

Figure 21:
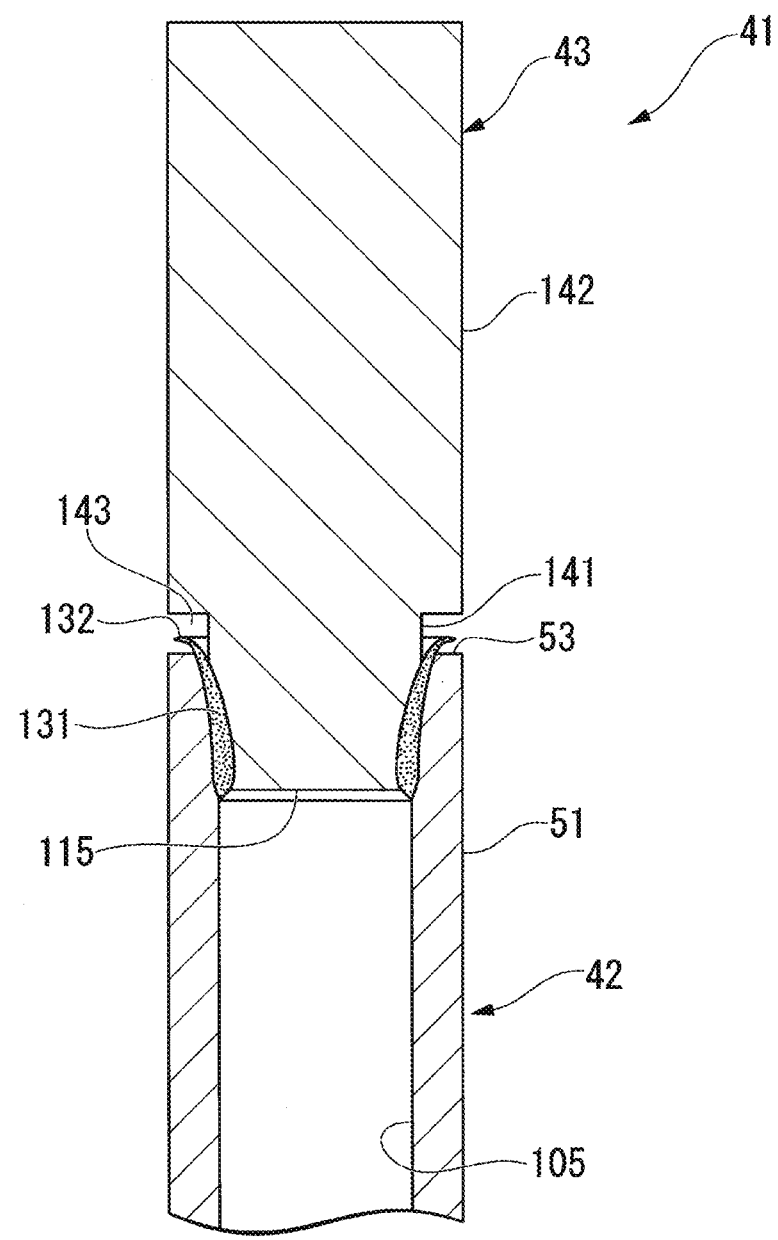
FIG. 21 is a cross-sectional view illustrating a modification example of the rod manufactured by the method for manufacturing the rod according to the one embodiment of the present invention.

Further, the respective outer diameter dimensions of the entire attachment shaft portion 43 and the entire connection shaft portion 44 are smaller than the outer diameter dimension of the main shaft portion 42 in the embodiment, but the outer diameter dimensions of only the end portions of the portions protruding from the main shaft portion 42 on the main shaft portion 42 side may be smaller than the outer diameter dimension of the main shaft portion 42. In other words, the attachment shaft portion 43 and the connection shaft portion 44 are not limited to the above-described examples as long as at least the outer diameter dimensions of the end portions of the portions protruding from the main shaft portion 42 on the main shaft portion 42 side are smaller than the outer diameter dimension of the main shaft portion 42. For example, as the attachment shaft portion 43 is illustrated in FIG. 21, the attachment shaft portion 43 may include a large diameter portion 142 at a position axially spaced apart from the main shaft portion 42, which has an outer diameter dimension larger than a small diameter portion 141 at the end portion of the portion protruding from the main shaft portion 42 on the main shaft portion 42 side and equal to or larger than the outer diameter dimension of the main shaft portion 42. This case leads to the attachment shaft portion 43 having an axial space 143 between the large diameter portion 142 and the main shaft portion 42. The same also applies to the connection shaft portion 44.

Further, the outer diameter dimension of the entire main shaft portion 42 is larger than the outer diameter dimensions of the attachment shaft portion 43 and the connection shaft portion 44 in the embodiment, but the portion that does not slidably contact the rod guide 31 and the seal member 33 may have a smaller diameter than the portion that slidably contacts the rod guide 31 and the seal member 33. In other words, the main shaft portion 42 is not limited to the above-described example as long as the outer dimension of the portion that slidably contacts the rod guide 31 and the seal member 33 including a portion that slidably contacts them during the assembling is larger than the outer diameter dimensions of the end portions of the respective portions of the attachment shaft portion 43 and the connection shaft portion 44 that protrude from the main shaft portion 42 on the main shaft portion 42 side. The main shaft portion 42 has a larger diameter dimension at least at the end portion on the attachment shaft portion 43 side than the outer diameter dimension of the end portion of the portion of the attachment shaft portion 43 that protrudes from the main shaft portion 42 on the main shaft portion 42 side to allow the outer peripheral portion of the attachment shaft portion 43 to be joined with the inner peripheral portion of the main shaft portion 42 by the welding connection with the aid of friction. The main shaft portion 42 has a larger diameter dimension at least at the end portion on the connection shaft portion 44 side than the outer diameter dimension of the end portion of the portion of the connection shaft portion 44 that protrudes from the main shaft portion 42 on the main shaft portion 42 side to allow the outer peripheral portion of the connection shaft portion 44 to be joined with the inner peripheral portion of the main shaft portion 42 by the welding connection with the aid of friction.

Further, the embodiment has been described citing the example when the main shaft portion formation member 42A is hollow throughout the entire axial length thereof. However, the main shaft portion formation member 42A is not limited thereto as long as it is hollow at least at portions with which the attachment shaft portion formation member 43A and the connection shaft portion formation member 44A are joined.

Further, the embodiment has been described citing the cylinder apparatus 11 in which the cylinder 15 has the opening portion 23 only on one end side. However, the present invention can also be applied to a cylinder apparatus in which the cylinder 15 has opening portions on both the end sides. In other words, the present invention can be applied to a cylinder apparatus including a tubular cylinder having an opening portion at least on one end side.

A first configuration of the above-described embodiment is a method for manufacturing a rod. One end portion of the rod is joined with a piston dividing an inside of a tubular cylinder having an opening portion at least on one end side into two chambers. An opposite end portion of the rod passes through a sliding contact member provided at the opening portion of the cylinder and protrudes from the cylinder. The manufacturing method includes a step of preparing a hollow first member, which becomes a portion of the rod that slidably contacts the sliding contact member, and a second member, which becomes a portion of the rod that does not slidably contact the sliding contact member and is formed so as to have a portion smaller in outer diameter dimension than an outer diameter dimension of the first member, a restraining step of placing a restraining member into abutment with an outer peripheral surface of the first member, a step of moving an inner peripheral surface of the first member and an outer peripheral surface of the second member closer to each other while rotating at least any one of the first member or the second member, and a step of joining the first member and the second member by a welding connection with the aid of friction by axially pressing in the first member and the second member by a predetermined amount after placing the inner peripheral surface of the first member and the outer peripheral surface of the second member into contact with each other. Therefore, the manufacturing quality can be improved.

According to a second configuration, in the first configuration, in the restraining step, the restraining member also serves as a chuck relatively non-rotationally holding the first member.

According to a third configuration, in the first or second configuration, in the restraining step, a range restrained by the restraining member is at least a range joined in the step of joining the first member and the second member by the welding connection.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2019-175583 filed on Sep. 26, 2019. The entire disclosure of Japanese Patent Application No. 2019-175583 filed on Sep. 26, 2019 including the specification, the claims, the drawings, and the abstract is incorporated herein by reference in its entirety.

REFERENCE SIGNS LIST 15 cylinder
23 opening portion
31 rod guide (sliding contact member)
33 seal member (sliding contact member)
35 piston
38 first chamber
39 second chamber
41 rod
42A main shaft portion formation member (first member)
43A attachment shaft portion formation member (second member)
44A connection shaft portion formation member (second member)
211 restraining member

The invention claimed is:

1. A method for manufacturing a rod, one end portion of the rod being joined with a piston dividing an inside of a tubular cylinder having an opening portion at least on one end side into two chambers, an opposite end portion of the rod passing through a sliding contact member provided at the opening portion of the cylinder and protruding from the cylinder, the manufacturing method comprising:
preparing a hollow first member, which becomes a portion of the rod that slidably contacts the sliding contact member, and a second member, which becomes a portion of the rod that does not slidably contact the sliding contact member and is formed so as to have a portion smaller in outer diameter dimension than an outer diameter dimension of the first member;
restraining a portion of the first member by placing a restraining member into abutment with an outer peripheral surface of the first member;
moving an inner peripheral surface of the first member and an outer peripheral surface of the second member closer to each other while rotating at least any one of the first member or the second member; and
joining the first member and the second member by a welding connection with the aid of friction by axially pressing in the first member and the second member by a predetermined amount after placing the inner peripheral surface of the first member and the outer peripheral surface of the second member into contact with each other,
wherein a range restrained in the restraining of the portion of the first member includes an entire axial range of a welded main body portion joined by the welding connection,
wherein the restraining member includes a plurality of divided pieces, and
wherein the placing of the restraining member into abutment with the outer peripheral surface of the first member includes placing the plurality of divided pieces into abutment with the first member from a radially outer side of the first member to form the restraining member covering the first member throughout an entire circumference.

2. The method for manufacturing the rod according to claim 1, wherein, in the restraining of the portion of the first member, the restraining member also serves as a chuck relatively non-rotationally holding the first member.

3. The method for manufacturing the rod according to claim 1, wherein, in the restraining of the portion of the first member, the range restrained by the restraining member is at least a range joined in the joining of the first member and the second member by the welding connection.

4. The method for manufacturing the rod according to claim 2, wherein, in the restraining of the portion of the first member, the range restrained by the restraining member is at least a range joined in the joining of the first member and the second member by the welding connection.

* * * * *